(12) United States Patent
Mehta et al.

(10) Patent No.: US 10,287,431 B2
(45) Date of Patent: May 14, 2019

(54) POLYPROPYLENE COMPOSITIONS AND METHODS TO PRODUCE THE SAME

(71) Applicant: ExxonMobil Chemical Patents Inc., Baytown, TX (US)

(72) Inventors: Aspy K. Mehta, Humble, TX (US); Andy H. Tsou, Houston, TX (US); Donald A. Winesett, Houston, TX (US); Gary M. Brown, Baytown, TX (US); Dalia Yablon, Livingston, NJ (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 245 days.

(21) Appl. No.: 14/672,669

(22) Filed: Mar. 30, 2015

(65) Prior Publication Data

US 2015/0315377 A1 Nov. 5, 2015

Related U.S. Application Data

(60) Provisional application No. 61/986,548, filed on Apr. 30, 2014.

(51) Int. Cl.
| | | |
|---|---|---|
| *C08L 53/02* | (2006.01) | |
| *C08K 3/013* | (2018.01) | |
| *C08K 7/04* | (2006.01) | |
| *C08J 3/20* | (2006.01) | |
| *C08L 23/12* | (2006.01) | |

(52) U.S. Cl.
CPC .............. *C08L 53/02* (2013.01); *C08J 3/201* (2013.01); *C08K 3/013* (2018.01); *C08K 7/04* (2013.01); *C08L 23/12* (2013.01); *C08L 53/025* (2013.01); *C08J 2323/10* (2013.01); *C08K 2201/016* (2013.01); *C08L 2205/025* (2013.01); *C08L 2205/03* (2013.01)

(58) Field of Classification Search
CPC .... C08L 53/02; C08L 53/025; C08L 2205/03; C08K 7/04; C08K 2201/016
See application file for complete search history.

(56) References Cited

U.S. PATENT DOCUMENTS

| | | | | |
|---|---|---|---|---|
| 4,987,173 A | * | 1/1991 | Nomura | C08K 7/08 524/423 |
| 5,036,127 A | * | 7/1991 | Ueno | C08K 3/22 524/423 |
| 5,039,525 A | * | 8/1991 | Tamashima | C08K 3/34 524/423 |
| 5,252,659 A | | 10/1993 | Koizumi et al. | |
| 5,256,734 A | * | 10/1993 | Sugihara | C08K 3/00 525/240 |
| H1518 H | * | 2/1996 | Djiauw | C08L 23/10 525/98 |
| 5,571,581 A | | 11/1996 | Koizumi et al. | |
| 5,723,527 A | * | 3/1998 | Sadatoshi | C08L 53/00 524/301 |
| 8,927,638 B2 | | 1/2015 | Nagashima et al. | |
| 9,359,498 B2 | * | 6/2016 | Mikami | C08L 23/16 |
| 2002/0040105 A1 | * | 4/2002 | Kanzaki | C08L 23/12 525/240 |
| 2010/0069560 A1 | * | 3/2010 | Masarati | C08L 23/10 524/502 |
| 2010/0152360 A1 | * | 6/2010 | Jiang | C08L 23/12 524/515 |
| 2010/0292371 A1 | * | 11/2010 | Maruyama | C08L 23/10 524/99 |
| 2017/0283660 A1 | * | 10/2017 | Tanaka | B32B 7/06 |

FOREIGN PATENT DOCUMENTS

| | | |
|---|---|---|
| EP | 1 548 054 | 6/2005 |
| EP | 2 386 602 | 11/2011 |
| WO | 2013/169325 | 11/2013 |
| WO | WO 2014046139 A1 * 3/2014 | .............. C08L 23/10 |

OTHER PUBLICATIONS

MOS-HIGE pamphlet published by Mitsui Plastics Inc., 2009.
Presentation "Hyperform HPR-803" by Milliken & Company, 2010.

* cited by examiner

Primary Examiner — Nicole M. Buie-Hatcher
(74) Attorney, Agent, or Firm — Kevin M. Faulkner

(57) ABSTRACT

Compositions comprising a continuous phase of at least one polypropylene; within the range of from 5 wt % to 50 wt % of a mineral hydroxide filler by weight of the composition, having an aspect ratio within the range of from 5 or 6 or 8 to 20 or 40 or 100 or 200 or 800 or 1000; and within the range of from 5 wt % to 40 wt % of a olefin block-containing copolymer by weight of the composition. Also described is a method of forming the compositions comprising combining the components as "masterbatches" or as neat ingredients, or some combination thereof.

40 Claims, 8 Drawing Sheets

US 10,287,431 B2

POLYPROPYLENE COMPOSITIONS AND METHODS TO PRODUCE THE SAME

CROSS-REFERENCE TO RELATED APPLICATION

The present application claims priority to U.S. Ser. No. 61/986,548 filed on Apr. 30, 2014, which is herein incorporated by reference.

FIELD OF THE INVENTION

The inventions disclosed herein relate to a polypropylene-based composition suitable for high impact, high stiffness applications such as interior automotive components, as well as the method for making such compositions.

BACKGROUND OF THE INVENTION

Polypropylene ("PP") is widely used in the automotive industry as base polymer for a variety of internal (e.g., instrument panel) and external (e.g., body panels) components. Typically, polypropylene-based compositions must provide a properties profile that includes high stiffness, high toughness at low temperatures, high resistance to distortion at elevated temperatures (i.e. high Heat Distortion Temperature or HDT), a Class 'A' surface to provide an aesthetic appeal, low shrinkage and easy moldability, all at a competitive price to the manufacturer. A key requirement is a strong combination of high stiffness (rigidity) and high toughness at low temperatures (resistance to deformation). A representation of the stiffness/low-temperature toughness balance that is available today is illustrated in FIG. 1A, and summarized in Table 1, which is a plot of Notched Izod Impact strength (ISO 180) at sub-zero temperatures (typically −29° C.; range −20 to −40° C.), plotted against ambient temperature Flexural Modulus (ISO 178), for compositions with melt flow rate ("MFR", 230° C., 2.16 kg) values in the range 10 to 30 g/10 min. The data encompass a broad range of current commercial products from a variety of suppliers. These products contain fillers, which contribute towards increased rigidity. Typically, mineral fillers such as talc are used.

Today's best automotive compounds displaying high stiffness (Modulus) and high low-temperature toughness (Impact Strength) fall in a region of the landscape, by way of a plot of −29° C. Notched Izod as a function of ambient temperature Flexural Modulus, bounded by a line connecting the data points for industry standards ADX5023 (Advanced Composites Inc.) and EF341-AE (Borealis), within or left (below) of this boundary line as depicted in FIG. 1A.

The automotive industry is looking for even higher-performing compositions, which would allow OEMs to continue light-weighting to improve fuel economy and reduce emissions. Cost reduction is also a primary driver, providing the impetus to advance the development of polyolefin-based compositions. To extend the stiffness/toughness boundary, will require the use of a high-crystallinity polypropylene matrix, combined with even higher-performing impact modifier and filler components. What is needed is a polypropylene-based composition that has a higher Modulus and Impact Strength.

Relevant publications include WO 2013/169325; an MOS-HIGE pamphlet published by Mitsui Plastics Inc. (2009); and a presentation "Hyperform HPR-803" by Milliken & Company (2010); U.S. Pat. No. 8,927,638; EP 1 548 054 A1; EP 2 386 602; U.S. Pat. Nos. 5,571,581; and 5,252,659.

SUMMARY OF THE INVENTION

Disclosed and described is a composition comprising (or consisting essentially of, or consisting of) a continuous phase of polypropylene; within the range of from 5 wt % to 50 wt % of a filler by weight of the composition, having an aspect ratio within the range of from 5 to 1000; and within the range of from 5 wt % to 40 wt % of a olefin block-containing copolymer by weight of the composition making up a discreet phase, or "rubber" domains.

Also disclosed are methods of forming the compositions comprising combining the components as "masterbatches" or as neat ingredients, or some combination thereof.

DETAILED DESCRIPTION

Figure 1A:
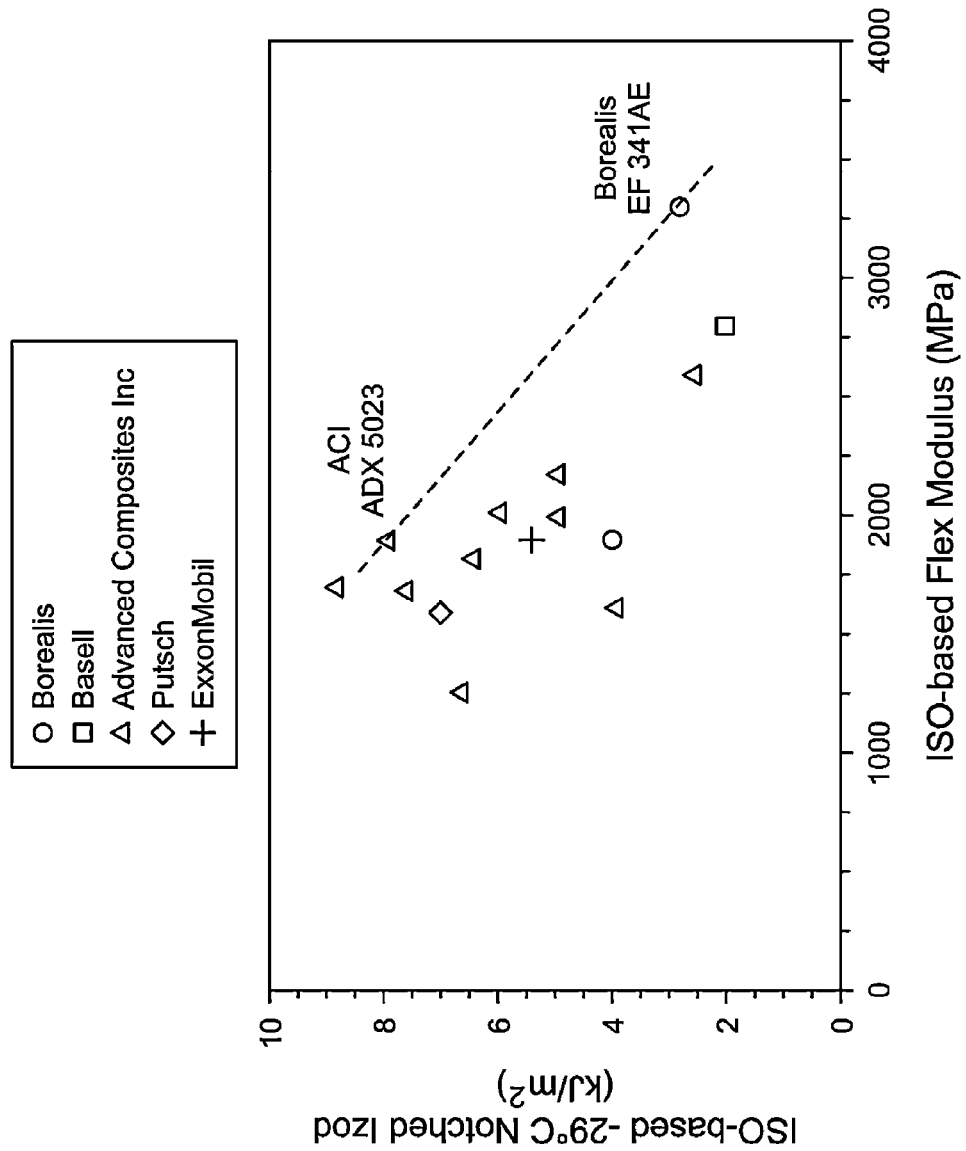
FIG. 1A is a plot of the ISO-based −29° C. Notched Izod versus Flexural Modulus of various commercial grade TPOs.

The automotive industry seeks polypropylene-based Thermoplastic Polyolefin compositions ("TPO", or simply "compositions") having a combination of high stiffness and high low-temperature impact strength. Few if any current commercial TPOs displays a stiffness/low-temperature toughness balance of 3000 MPa Flexural Modulus and 10 kJ/m² Notched Izod impact at −29° C. (ISO measurement protocol). The inventors have developed compositions that meet this target using a polypropylene polymer, a block copolymer as described herein, and a high aspect ratio filler. The stiffness/toughness balance achieved, when observed on a plot of −29° C. Notched Izod Impact versus ambient temperature Flexural Modulus, appears well differentiated from today's industry standards. The block copolymer elastomer is demonstrated to provide substantially higher impact strength than ethylene plastomers (e.g., ethylene/octene), widely used in compound formulations as an impact modifier. A distinguishing feature of the prototype TPO compositions described herein is, versus both neat ICPs/TPOs and talc-filled compounds, the substantial difference between Chord Modulus and Secant Flexural Modulus values, which increases with an increase in overall stiffness. This differentiation is one characterizing feature of the inventive compositions versus known mineral filler-based automotive compounds. Typical automotive compositions containing 30 wt % mineral filler are characterized by enhanced stiffness and resistance to elevated temperatures, but with relatively low toughness. Surprisingly, a composition of, for example, 30 wt % high aspect ratio filler and 30 wt % elastomer, provides a unique combination of high stiffness and high low-temperature impact strength.

Thus, the invention described herein is directed to a polypropylene composition and methods of forming the composition. In particular, described herein is a composition comprising (or consisting essentially of) a continuous phase of polypropylene, within the range of from 5 or 10 or 15 wt % to 35 or 40 or 50 wt % of a filler by weight of the composition, having an aspect ratio within the range of from 5 or 6 or 8 to 20 or 40 or 100 or 200 or 800 or 1000; and within the range of from 5 or 10 wt % to 25 or 30 or 40 wt % of a olefin block-containing copolymer by weight of the composition. The olefin block-containing copolymer typically forms discontinuous domains within the polypropylene matrix.

As used herein, the "filler" is a material in particulate, plate, and/or strand form that is not soluble or meltable in the other polymers of the composition at the temperatures at which it is processed, preferably up to 250° C., having the above mentioned aspect ratio (length/width of the material), determined by any suitable means of measuring the physical dimensions of small particles, but preferably using AFM micrograph technique. Preferably, the filler is a mineral hydroxide filler, which comprises Group 1 to 14 compounds (especially Groups 2, and 12-14) alone or with silicon or sulfur in oxidized and/or hydrated form, including natural minerals such as micas, silicates, carbonates, etc. Most preferably, the filler comprises hydrated compounds including hydroxides of Ca, Mg, Al, and/or B (with or without sulfur or silicon). Finally, even more preferably, the filler is a metal salt of an oxysulfate, aluminoxysulfate, aluminosilicate, silicate, borate, or combination thereof, examples of which include magnesium or calcium oxysulfate. Most preferably, the filler is a magnesium oxysulfate (MOS) in the form of whiskers. Also, in certain preferred embodiments, the filler excludes glass (predominately silicate) fillers.

As used herein, the "olefin block-containing copolymer" is a copolymer or terpolymer (hereinafter "copolymer") that contains olefin blocks and at least one other polymerizable monomer-derived unit such as styrene, acrylate, etc., where the "olefin block" is one or two or more α-olefin derived units such as ethylene and propylene derived groups, wherein each group occurs in long sequences. Desirable olefin block-containing copolymers include styrene-butadiene-styrene (SBS), styrene-butadiene/butylene-styrene (SBBS), styrene-isoprene-styrene (SIS), styrene-ethylene/propylene-styrene (SEPS), styrene-ethylene/propylene (SEP), styrene-ethylene/butylene-styrene (SEBS), styrene-ethylene/ethylene/propylene-styrene (SEEPS), and styrene-isobutylene-styrene (SIBS), and hydrogenated versions thereof (of the unsaturated non-styrenic block portions). Preferably, the olefin block-containing copolymer is selected from the group consisting of styrene-butadiene-styrene block copolymers, styrene-isoprene-styrene block copolymers, more preferably hydrogenated versions of these polymers such as styrene-ethylene/propylene-styrene block polymers and styrene-ethylene/butene-styrene block polymers, and mixtures thereof. Even more preferably, the olefin block-containing copolymer is a hydrogenated styrene-olefin block-styrene copolymer having within the range of from 5 wt % to 25 wt % styrene-derived units by weight of the copolymer. The olefin block containing copolymers could be tri-blocks or di-blocks or a combination of both.

As used herein, the phrase "consisting essentially of" means that that the composition being referred to does not include any unnamed components to a level of greater than 5 or 3 or 1 wt %. The inventive compositions may alternatively "consist of" the named components.

As used herein, the "polypropylene" is a homopolymer or copolymer of propylene-derived units and within the range from 0.05 or 0.1 or 0.5 wt % to 2.0 or 4.0 wt % ethylene or $C_4$ to $C_{10}$ α-olefin comonomer derived units. Preferably, the polypropylene useful herein is a homopolymer of propylene-derived units. The polypropylene is preferably a high crystallinity polypropylene, having a crystallinity of at least 40%, more preferably at least 70% or 80% or 90% as determined by DSC. The term "crystalline" as used herein, characterizes those polymers that possess high degrees of inter- and intra-molecular order in the solid state. The "polypropylene" can be a polymer of one measured MFR or a mixture of two or more polypropylenes having distinct MFR values, the overall MFR for the mixture being the "MFR" of the "polypropylene". For example, a 2 to 8 MFR polypropylene homopolymer may be blended with a 55 to 75 MFR polypropylene homopolymer to form the "polypropylene" suitable for the composition.

Melting point ($T_m$) and percent crystallinity of polypropylenes described herein are determined using the following procedure according to ASTM E 794-85. Differential scanning calorimetric (DSC) data is obtained using a TA Instruments model 2910 machine or a Perkin-Elmer DSC 7 machine. In the event that the TA Instruments 2910 machine and the Perkin-Elmer DSC-7 machine produce different DSC data, the data from the TA Instruments model 2910 shall be used. Samples weighing approximately 5-10 mg are sealed in aluminum sample pans. The DSC data is recorded by first cooling the sample to −50° C. and then gradually heating it to 200° C. at a rate of 10° C./minute. The sample is kept at 200° C. for 5 minutes before a second cooling-heating cycle is applied. Both the first and second cycle thermal events are recorded. Areas under the melting curves are measured and used to determine the heat of fusion and the degree of crystallinity. The percent crystallinity (X %) is calculated using the formula, X %=[area under the curve (Joules/gram)/B (Joules/gram)]·100, where B is the heat of fusion for the homopolymer of the major monomer component. These values for B are to be obtained from the POLYMER HANDBOOK, Fourth Edition (John Wiley & Sons, New York, 1999). A value of 189 J/g (B) is understood to be the heat of fusion for 100% crystalline polypropylene.

Preferably, the polypropylene has a melting point temperature ("$T_m$", DSC) within the range of from 130° C. or 140° C. or 150° C. to 160° C. or 165° C. or 170° C. Also, the polypropylene preferably has a Melt Flow Rate ("MFR", 230° C./2.16 kg) within the range of from 4 or 12 g/10 min to 70 or 80 or 100 g/10 min. As used herein, "MFR" is measured per ASTM-D-1238, and throughout the specification, polymers and/or polymer compositions may be referred to as being, for example, "4.5 MFR" which means it has an MFR of 4.5 g/10 min as is known in the art. The Melt Index ("MI"), typically used for ethylene-based polymers, is also measured by the same ASTM at 190° C./2.16 kg.

The composition is made up of the combination of at least the filler, the olefin block-containing copolymer, both within the range of the named weight percent proportions by weight of the entire composition, and the remainder being the polypropylene. The composition may also include minor amounts of other ingredients such as antioxidants, nucleating agents, colorants, antiblock, and other common additives as is known in the art. Preferably, the composition has a MFR within the range of from 5 g/10 min to 30 or 40 or 50 g/10 min.

The inventive compositions have several desirable properties measurable by ASTM or ISO methods. The composition preferably has a Flexural Modulus (ISO) (Note: ISO Flexural Modulus is exclusively a chord modulus) of greater than 2000 or 2500 or 3000 MPa; or within the range of from 2000 or 3000 MPa to 5000 MPa. Also, the compositions preferably have a Notched Izod Impact Resistance (−29° C., ISO) of greater than 2 or 6 or 8 or 10 kJ/m$^2$; or within a range of from 2 or 6 or 8 kJ/m$^2$ to 15 or 20 kJ/m$^2$. Most desirably, these features of Modulus and Impact Resistance are found together in the inventive compositions.

Figure 1B:
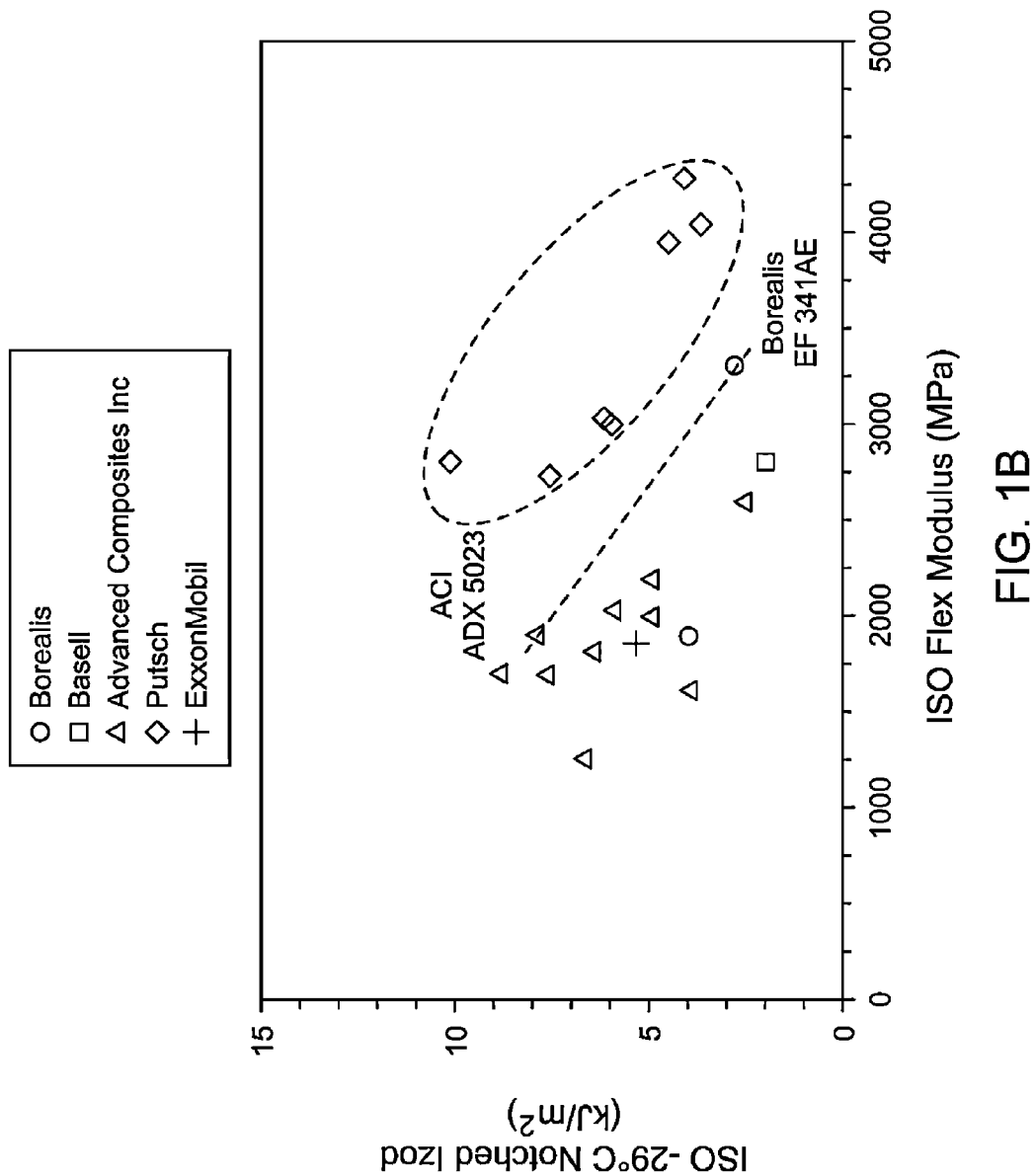
FIG. 1B is the same, but with added inventive Examples.

FIG. 1B shows graphically this relationship. Preferably, the compositions fall above and to the right of a line defined by the ISO-based −29° C. Notched Izod as a function of the ISO-based Flexural Modulus, y=−0.0038x+15.27. Even more preferably the compositions fall above the line (have a greater y-intercept) of a line having a y-intercept of 16 or 16.5 or 17, and most preferably, the compositions fall between and on lines having a y-intercept of 15.5 or 16 or 16.5 to 22 or 23 or 25.

The compositions preferably have a heat distortion temperature ("HDT") within the range of from 90 or 95° C. to 100 or 110 or 130° C. Finally, the compositions preferably have a flow direction Coefficient of Linear Thermal Expansion ("CLTE") within the range of from 0.50×10$^{-5}$/° C. to 3.0×10$^{-5}$/° C.; and a cross-flow direction CLTE within the range of from 8.0×10$^{-5}$/° C. to 15.0×10$^{-5}$/° C. Preferably, polar-graft polymers, such as maleic anhydride-grafted polypropylene, are absent from the inventive compositions, meaning they are not added to the composition.

Preferably, for the inventive compositions, the Chord Modulus changes by at least 2 or 2.5 or 3 or 3.5 times (or changes by a coefficient within the range of from 2 or 2.5 to 3.5 or 4 or 4.5) the change in 1% Secant Flexural Modulus over a range of 10 to 40 wt % loading of the filler. Stated another way, the composition can be characterized in part such that the slope (m) of the Chord Modulus (y) as a function of 1% Secant Flexural Modulus (x) line is greater than 1.8, more preferably greater than 2.0 or 2.5, most preferably greater than 3.0 or 3.4, as demonstrated, for example, in FIGS. 6A-6C.

The inventive compositions may be formed by any suitable means of melt mixing such as by melt extrusion, etc., and the individual components may be combined in any order. A preferred method of forming a composition comprises (or consists essentially of) combining and melt processing (e.g., such as by extrusion) a first mixture of a propylene-based polymer and a filler with a second mixture of a propylene-based polymer and olefin block-containing copolymer, followed by isolating the composition; wherein the composition comprises a continuous phase of polypropylene and discontinuous domains of filler and olefin block-containing copolymer in the proportions set forth above. The melt temperature can be any desirable temperature above the lowest melting polymeric component, but below the temperature at which decomposition occurs in the polypropylene or block copolymer, most preferably within the range of from 180 or 190 or 200° C. to 210 or 220 or 240° C.

In a preferred method of forming the compositions described herein, the filler is combined with the other ingredients as a masterbatch. By "masterbatch" what is meant is a mixture of the named ingredient with some other diluent such as a polymer, especially a polymer very similar to or identical to the other components of the compositions. The most preferable polymer diluent is polypropylene, especially one that is identical to that used in the composition. Desirably, the filler may be present in the masterbatch within a range of from 10 or 20 or 30 wt % to 60 or 70 or 80 or 90 wt % by weight of the entire masterbatch. Likewise, the olefin block-containing copolymer may also be in the form of a masterbatch, preferably mixed in similar proportions with a polypropylene either similar to or identical to the polypropylene in the composition.

Another desirable method of forming a composition comprises (or consists essentially of) combining and melt processing a neat filler, as opposed to a masterbatch, the filler having an aspect ratio within the range of from 5 to 1000; with a polypropylene and olefin block-containing copolymer, together or separately, followed by isolating the composition; wherein the composition comprises a continuous phase of polypropylene and within the range of from 5 wt % to 50 wt % of the filler and within the range of from 5 wt % to 26 wt % of a olefin block-containing copolymer. By "neat" what is meant is that the component is not diluted or blended ("blend" and "mix" are used interchangeably, simply meaning to intimately combine two or more components) with any other substance until it is used in the composition. Most preferably, in this method the components are added in the order of: polypropylene, neat filler, and olefin block-containing copolymer, wherein the neat filler is added to the melted polypropylene and this mixture is then added as a melt to the olefin block-containing copolymer. When using the filler in neat form a pre-treatment is typically performed: i) Pre-drying, since the preferred magnesium oxysulfate (MOS) filler is hygroscopic, ii) Contacted with magnesium oxide to neutralize the filler which is slightly alkaline, and iii) Contacted with magnesium stearate, to improve the dispersion of the fibers in the polypropylene matrix. With masterbatches, this pretreatment is typically performed during preparation, though predrying the masterbatch, prior to use is desirable and was performed.

In any case, once isolated the inventive compositions can be formed by any suitable means into articles of manufacture, especially automotive components that comprise (or consist essentially of) the composition. The compositions may be suitable for both internal (e.g., instrument panel) and external (e.g., body panels) automotive components. Some suitable methods of forming the composition into articles include injection molding and thermoforming.

The various descriptive elements and numerical ranges disclosed herein for the inventive compositions and methods of making the compositions can be combined with other descriptive elements and numerical ranges to describe the invention; further, for a given element, any upper numerical limit can be combined with any lower numerical limit described herein, including the examples. The features of the invention are demonstrated in the following non-limiting examples.

EXAMPLES

In Table 1 are published data related to comparative polypropylene compositions suitable for such applications as interior and exterior automotive components. These data are plotted in FIG. 1A.

TABLE 1

Comparative Polypropylene Compositions

| Grade/Supplier | Flexural Modulus (ISO 180; MPa) | Notched Izod (ISO 178; kJ/m²) | MFR (dg/min) |
| --- | --- | --- | --- |
| EF341-AE/Borealis | 3300 | 2.8 (−20° C.) | 15 |
| ED230HP/Borealis [1] | 1900 | 4 (−20° C.) | 10 |
| ED230HP/Borealis | 2800 | 2 (−40° C.) | 18 |
| ADX-2001/Adv Comp Inc [2] | 1820 | 6.5 (−40° C.) | 23 |
| ADX-5017/Adv Comp Inc | 2016 | 6 (−40° C.) | 28 |
| ADX-5028/Adv Comp Inc | 1700 | 8.9 (−40° C.) | 11 |
| ADX-5023/Adv Comp Inc | 1900 | 8 (−29° C.) | 20 |
| ADX-5016/Adv Comp Inc | 2000 | 5 (−40° C.) | 20 |
| ATX-904-20/Adv Comp Inc | 2593 | 2.6 (−29° C.) | 13 |
| ATX-639MX2N/Adv Comp Inc | 1690 | 7.7 (−40° C.) | 7 |
| ATX-832N/Adv Comp Inc | 2180 | 5 (−40° C.) | 30 |
| ATX-646M/Adv Comp Inc | 1618 | 4 (−40° C.) | 24 |
| ATX-781/Adv Comp Inc | 1254 | 6.7 (−40° C.) | 15 |
| ELAN ST-716/Putsch [3] | 1600 | 7 (−20° C.) | 14 |
| BMU-147/ExxonMobil [4] | 1900 | 5.4 (−29° C.) | 14 |

[1] Borealis Polyolefine GmbH, Schwechat, Austria
[2] Advanced Composites Inc, Subsidiary of Mitsui, Sidney, Ohio
[3] Putsch GmbH, Nürnberg, Germany
[4] ExxonMobil Chemical Co. (EMCC), Houston, Texas The thermoplastic polyolefin composition ADX-5023 (Advanced Composites Inc.) is a well-regarded industry standard for use in interior automotive applications (need high level of low-temperature impact strength). The TPO Daplen™ EF-341 AE (Borealis) is similarly regarded for use in exterior applications (need high level of stiffness). These two products form "book-ends" for the desired properties profile of high stiffness coupled with high low-temperature impact strength. As is seen in FIG. 1A and FIG. 1B, they set the boundary of high performance available from current commercial products. All the other products fall inside, or to the left of this boundary line. A "target" for new TPO compositions would be those that fall to the right and above the line in FIGS. 1A and B (e.g, 2500 to 3000 MPa at 10 kJ/m² or higher at −29° C.).

Choice of Impact Modifier

An example of a polyolefin modifier is an ethylene plastomer, particularly ethylene-octene plastomers (example: Exact™ from ExxonMobil, Engage™ from Dow Chemical). To scope the performance of ethylene plastomers, a bi-blend (64 wt % PP, 36 wt % plastomer) of an EMCC 52 MFR Ziegler-Natta produced polypropylene homopolymer and Dow's Engage 8180 plastomer (having a melt index (ASTM-D-1238, 190 C/2.16 kg) of 0.5 g/10 min, a density of 0.863 g/cm³, and comprising 43 wt % C8) was prepared via melt mixing on a 30 mm ZSK twin-screw extruder. The product was tested for ASTM Notched Izod (ASTM D-256), and it was found that the 23° C. Notched Izod was 78 kJ/m² or more (no breaks), the 0° C. was 73 kJ/m² or more (also, no breaks), and the −18° C. was 16.7 kJ/m², where there was a complete break. The unfilled bi-blend at 36 wt % plastomer (a higher-than-normal loading of rubber impact modifier) shows insufficient low-temperature impact resistance, with complete breaks at −18° C. A higher level of impact modification is desired beyond what plastomers can offer.

Several other elastomers were evaluated that are not typically used with polypropylene, including cis-1,4-polyisoprene (natural rubber TSR-L with −70° C. $T_g$; synthetic rubber NIPOL IR 2200L, −70° C. $T_g$ from Zeon Chemicals, Louisville, Ky.), cis-1,4-polybutadiene (BUDENE 1207, −100° C. $T_g$ from Goodyear Chemical, Akron, Ohio), hydrogenated SIS block copolymer (SEPTON™ 2004, 18 wt % styrene, from Kuraray America Inc., Houston, Tex.), vinyl-bond hydrogenated SIBS (HYBRAR™ 7311, 12 wt % styrene, vinyl-polydiene soft block, also from Kuraray), and EXACT 5361 Elastomer, 3 dg/min MI at 190C/2.16 kg, 0.860 g/cm³ density, ethylene-octene copolymer, from ExxonMobil Chemical Co, Houston, Tex., as the plastomer control. 70/30 blends (PP/elastomer impact modifier) were prepared on a 30 mm ZSK, twin screw extruder. The PP component for all the bi-blends was a 4.6 MFR Ziegler-Natta based homopolymer (ExxonMobil Chemical Co.). The blends were injection molded into ASTM specimens on a Nissei injection press (model NS20-2A) and low-temperature Notched Izod impact data were measured. The impact data are shown in Table 2, where "NB" means "no break" and "C" means complete break.

TABLE 2

ASTM Notched Izod of 4.6 MFR Polypropylene with different elastomers (30 wt %)

| Temperature (° C.) | ICP control | Exact 5361 | Natural Rubber | Budene 1207 | Septon 2004 | Hybrar 7311 |
| --- | --- | --- | --- | --- | --- | --- |
| 23 | >72 (NB) | >50 (NB) | >68 (NB) | 9.1 (C) | >81 (NB) | >73 (NB) |
| 0 | >62 (NB) | 31.6 (C) | 12.9 (C) | 4.5 (C) | >86 (NB) | 14.2 (C) |
| −18 | 9.3 (C) | 8.9 (C) | 5.8 (C) | 4 (C) | >68 (NB) | 1.9 (C) |
| −29 | 7.1 (C) | 6.9 (C) | 5.1 (C) | 3.4 (C) | 18.9 (C) | 1.8 (C) |
| ASTM Flexural Modulus (MPa) | 864 | 883 | 787 | 883 | 925 | 462 |

Among the 70/30 bi-blends tested, all with the same polypropylene, and compounded and injection molded the same way, the hydrogenated SIS (SEPTON 2004) provided markedly improved −29° C. Notched Izod impact. In addition, this blend also had the highest flex modulus. The modulus numbers were similar, aside from the low value of the final composition (PP/HYBRAR™ 7311 bi-blend), which comprises miscible components.

The hydrogenated SIS elastomer maintained its impact modification capability in blends with moderately high MFR polypropylenes. To provide good flowability during injection molding of the final filled composition, polypropylenes of moderately high MFR of greater than 50 g/10 min are preferred. Table 3 illustrates the Notched Izod impact and the −29° C. Gardner impact (where "P" means "partial break", "D" means "ductile failures", "DB" means "ductile/brittle", and "S" means "shatter") for bi-blends of Exxon-Mobil Ziegler-Natta polypropylenes (70 wt %) of three different MFRs (4.6, 35 and 65 g/10 min) with the hydrogenated SIS elastomer (30 wt %). The blends were prepared on a 30 mm ZSK twin-screw extruder and ASTM specimens were injection molded on the Nissei injection press. Example compositions include:

4.5 MFR PP (70 wt %)+Septon 2004 (30 wt %)
35 MFR PP (70 wt %)+Septon 2004 (30 wt %)
65 MFR PP (70 wt %)+Septon 2004 (30 wt %)
65 MFR PP (70 wt %)+Exact 5361 plastomer (30 wt %), control blend

TABLE 3

ASTM Notched Izod (kJ/m$^2$) and Gardner Impact for blends of Septon 2004 (30 wt %) with different polypropylenes (70 wt %) of different MFR values

| Temperature (° C.) | 4.5 MFR PP + Septon 2004 | 35 MFR PP + Septon 2004 | 65 MFR PP + Septon 2004 | 65 MFR PP + Exact 5361 |
|---|---|---|---|---|
| 23 | >75 (NB) | >71 (NB) | >69 (NB) | 8 (C) |
| 0 | >65 (NB) | >76 (NB) | >70 (NB) | 4 (C) |
| −18 | 38 (P) | >67 (NB) | 24 (C) | 3 (C) |
| −29 | 10 (C) | 19 (C) | 12 (C) | 3 (C) |
| ASTM Gardner Impact (in · lb) | | | | |
| | 313 (12 D) | >320 (NB) | >320 (NB) | 230 (6D, 6 DB, 1 S) |

The results in Table 3 indicate that the hydrogenated SIS elastomer provides good, stable impact modification of polypropylene through 65 MFR. Its impact modification capability far outweighs that of the plastomer Exact 5361 (3 g/10 min melt index (190/2.16 ASTM-D-1238), density of 0.860 g/cm$^3$, and comprising 42 wt % C8), for a 65 MFR polypropylene. This stability of the impact resistance with polypropylenes of increasing MFR is not typical and indicates potential for a favorable impact/processability balance. Also shown in Table 3 are values for Gardner impact at −29° C. The data confirm the Notched Izod numbers, showing the 35 and 65 MFR PP blends to have very high resistance to impact at low temperatures.

The morphologies (Field-Emission SEM micrographs with one AFM phase micrograph) of the blends of hydrogenated SIS elastomer with 4.6, 35 and 65 MFR PPs show hydrogenated SIS dispersions. These are observed to be space-filling arrangements of large (approx. 2 μm×2 μm) and small (approx. 0.5 μm×0.5 μm) domains. The AFM micrograph shows microphase separation of the polystyrene domains within the hydrogenated SIS dispersions. In the field-emission scanning electron micrographs, dispersions of different aspect ratio are observed, dependent on the viscosity ratio between the hydrogenated SIS and the different polypropylenes. The dispersions cover the range from lamellar (ribbons) to discrete domains (droplets).

Figure 2:
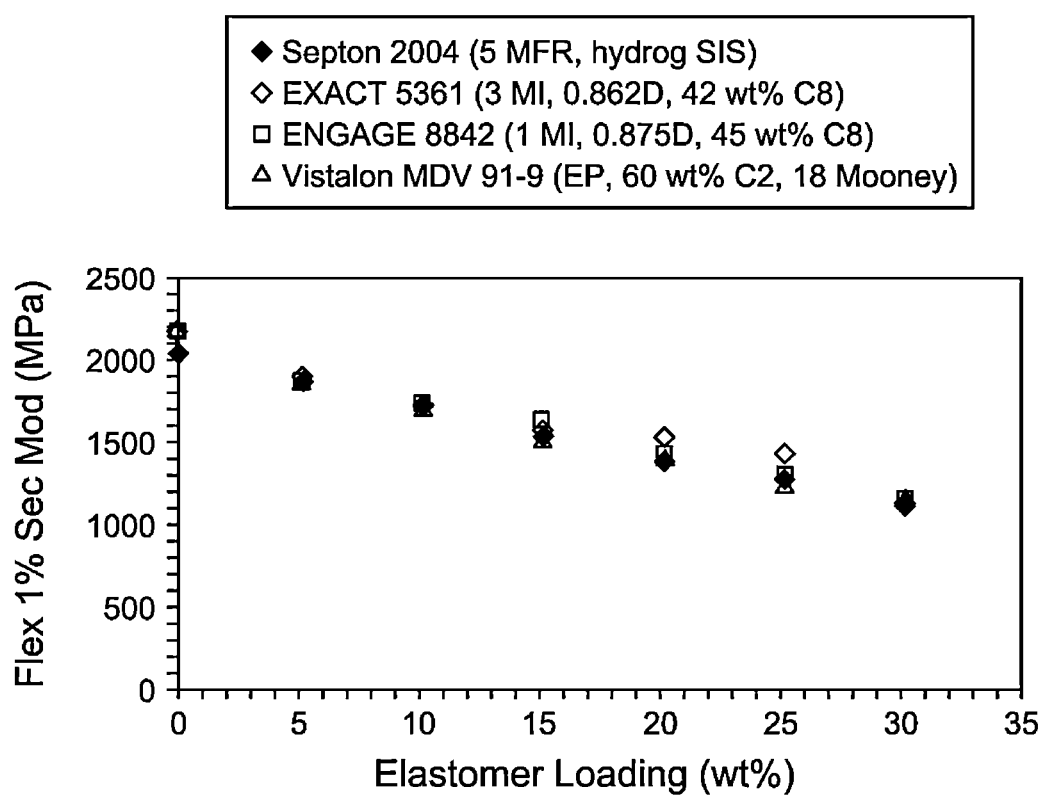
FIG. 2 is the Molded-part Flexural Modulus of polypropylene/elastomer bi-blends (4.6 MFR polypropylene, different elastomers) plotted as a function of elastomer loading.

The drop-off in Flexural Modulus of the bi-blend with increasing levels of Septon 2004 elastomer was compared versus similar bi-blends of the same PP (4.6 MFR) with other elastomeric impact modifiers. The data are shown in FIG. 2, which plots ASTM Flexural Modulus (D-790) versus elastomer loading for different bi-blend compositions, all melt compounded under similar mixing conditions (bench scale twin-screw extruder; 125 rpm, 190° C., 3 min) The drop-off in blend Flexural Modulus with increased loading of the SIS matched that seen with a variety of other elastomeric modifiers, indicating a similar response for all the elastomers tested.

Choice of Polypropylene

The desirable polypropylene for use in the inventive compositions preferably has a high crystallinity to provide high inherent matrix stiffness and an appropriate molecular weight that offered balance between easy moldability (lower MW preferred) and inherent matrix toughness (higher MW preferred). The results in Table 4, for 80/20 blends of PP/Exact 5361, demonstrate the issue of balanced MW. The 4.6 MFR polypropylene (ExxonMobil Chemical Co.) contributes to higher impact resistance, compared to the 110 MFR polypropylene (Sunoco F-1000HC from Braskem-Sunoco, Philadelphia, Pa.). As shown previously in Table 3, an MFR increase to about 65 g/10 min provides an appropriate impact versus moldability balance. ExxonMobil grade PP-9999SS (65 MFR; 4$^{th}$ generation Ziegler-Natta catalyst) produced the most preferred blends.

TABLE 4

ASTM Notched Izod for 80/20 wt/wt blends of polypropylene with Exact 5361

| Temperature, ° C. | 4.6 MFR iPP | 110 MFR iPP |
|---|---|---|
| 23 | 18 | 3.5 |
| 0 | 6.5 | 2.5 |
| −18 | 3.5 | 3.0 |

Choice of Filler

Different fillers were studied to compare their efficiencies to enhance modulus (i.e. MPa enhancement per 1 wt % filler loading), a higher efficiency value being more desirable. Details on the fillers evaluated are shown in Table 5. The study involved the preparation of melt blends of the different fillers in polypropylene (4.6 MFR from ExxonMobil Chemical Co.) on a bench-scale twin screw extruder. Compounding conditions were: 100-125 screw rpm, 190° C.-200° C. melt temperature, 3 min mixing time. The fillers were incorporated via a masterbatch (MB) and/or as neat preparations.

TABLE 5

Properties of the fillers

| Filler | Specific Gravity (g/cm$^3$) | Form | Aspect Ratio | Grade/Supplier |
|---|---|---|---|---|
| Talc, Mg silicate hydroxide [Mg$_3$Si$_4$O$_{10}$(OH)$_2$] | 2.75 | Lamellar platelets (neat) | ~5 | JETFIL 700C, Luzenac America, Greenwood Village, Colorado |
| Clay (Kaolin), [Al$_2$Si$_2$O$_5$(OH)$_4$], Hydrated Al silicate | 2.2 | Lamellar layers (neat) | ~20 | POLESTAR 400, Imerys, France |

TABLE 5-continued

Properties of the fillers

| Filler | Specific Gravity (g/cm$^3$) | Form | Aspect Ratio | Grade/Supplier |
|---|---|---|---|---|
| Wollastonite, CaSiO$_3$, Ca metasilicate | 2.95 | Acicular (neat) | 10-20 | ASPECT 3992, Nyco Minerals Inc., Willsboro, New York |
| Carbon nanofibers (CNF) [carbon] | 1.95 | Long fibers (neat) | 40-800 | PR-24, PR-19, Pyrograf Products Inc., Cedarville, Ohio |
| MOS, [MgSO$_{4.5}$Mg(OH)$_2$•3H$_2$O], Mg oxysulfate | 2.3 | Whiskers (MB and neat) | 10-40 | MOS-HIGE MB, Mitsui; H803 whiskers, Milliken Chem, Spartanburg, S. Carolina |
| Halloysite, [Al$_2$Si$_2$O$_5$(OH)$_4$•2H$_2$O], Aluminosilicate | 2.0 | Nanotubes (MB) | 10-40 | Pleximer, NATURALNANO, Rochester, New York |
| Multiwall nanotubes [carbon] | 1.7 | Nanotubes (MB) | 40-200 | PLASTICYL MB, Nanocyl, Sambreville, Belgium |
| Graphene [carbon] | 2.2 | Nanoplatelets (neat) | 100+ | xGNP25 ™, XG Sciences, Lansing, Michigan |

Figure 3:
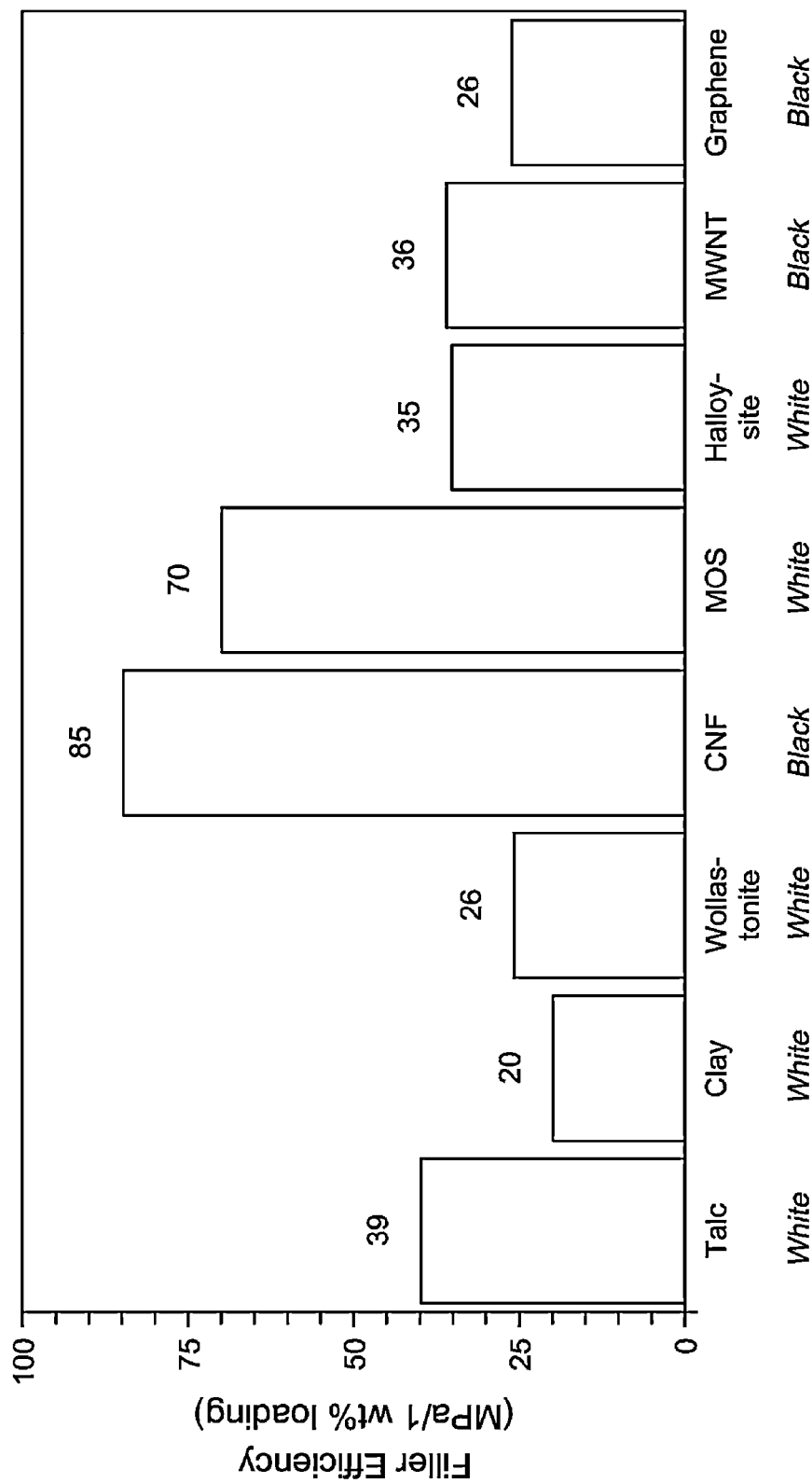
FIG. 3 is a bar graph of the Flexural Modulus enhancement efficiency of different fillers in blends with polypropylene (MPa/1 wt % filler loading).

The filler efficiency numbers obtained (essentially, the slope of Flexural modulus versus filler loading for each PP/filler bi-blend set) are compared in FIG. 3. The carbon nanofibers and the magnesium oxy-sulfate (MOS) whiskers (or fibers) gave the highest level of PP modulus reinforcement. Graphene and carbon multi-wall nanotubes (MWNT) showed low filler efficiency, even though they offer high aspect ratio. These fillers are difficult to handle and to disperse via melt mixing.

Based on these results, additional polymer melt blends of the carbon nanofibers and MOS whiskers (or fibers) were prepared and tested. Micrographs of the neat carbon nanofibers and the magnesium oxy-sulfate whiskers reveal the carbon nanofibers to be long generally straight fibers, with diameters of 0.1 to 0.3 μm; very rarely are the two ends of the same fiber observed. The fibers are clearly of high aspect ratio, but with significant intermingling. The MOS fibers are of lower aspect ratio and bundled, but with much less intermingling. Fibrous fillers with high levels of intermingling are generally more difficult to uniformly disperse, to take full advantage of the high aspect ratio. The carbon nanofiber compound comprised 20 wt % original PR-24 and 20 wt % Exact™ 9361 ExxonMobil plastomer (3.5 MI, density of 0.864 g/cm$^3$, and comprising C2/C4) in polypropylene (5 MFR from ExxonMobil Chemical), compounded on a Leistritz twin screw extruder (27 mm, L/D 48-52) at American Leistritz Extruders lab in Somerville, N.J. The magnesium oxy-sulfate masterbatch compound comprised 50 wt % original HPR-803 whiskers, also compounded in polypropylene (4.6 MFR) on the same Leistritz compounding extruder. The carbon nanofibers are observed to reside in the polypropylene matrix phase, which is desirable. They are observed to exist in several orientations within the MD-ND plane, diminishing the opportunity for maximum stiffness reinforcement. Their fiber lengths are difficult to discern, given the various orientations, they appear to be significantly shorter than the neat fibers shown previously. By contrast, the magnesium oxy-sulfate whiskers appear to generally lie along the MD-ND plane. Long fibers/whiskers are observed, suggesting a measure of aspect ratio retention. The whiskers are however still assembled in bundles, suggesting the need for improved dispersability.

The product ingredients for developing high-performing filled compounds to achieve the challenging product targets are thus: a composition comprising (or consisting essentially of) a continuous phase of polypropylene; within the range of from 5 or 10 or 15 wt % to 35 or 40 or 50 wt % of a filler by weight of the composition, having an aspect ratio within the range of from 5 or 6 or 8 to 20 or 40 or 100 or 200 or 800 or 1000; and within the range of from 5 or 10 wt % to 25 or 30 or 40 wt % of a olefin block-containing copolymer by weight of the composition. A preferred example includes a continuous phase of high crystallinity polypropylene having an MFR of about 65 g/10 min (PP-9999SS, ExxonMobil Chemical); hydrogenated styrene-isoprene-styrene block copolymer for high impact resistance at low temperatures (Septon 2004); and a magnesium oxy-sulfate filler such as i—MOS MB from Mitsui Chemicals, and ii—Neat HPR-803 whiskers from Milliken Chemicals for high filler efficiency (MPa enhancement per 1 wt % loading).

Compound Preparation

Different melt-compounding approaches were adopted to prepare composite formulations comprising polypropylene, filler and elastomer.

A. Masterbatch Approach.

Two MOS masterbatches were used for compound preparation:

A commercially available magnesium oxy-sulfate masterbatch from Mitsui Chemicals (Mos Hige MB, 70 wt % Mos Hige A), and An internally produced MOS masterbatch (50 wt % Hyperform 803 MOS fibers from Milliken Chemical in 50 wt % 4.6 MFR PP resin, prepared at American Leistritz Extruders Lab in Somerville, N.J.)

The masterbatch of the hydrogenated SIS elastomer, Septon 2004, involved the 65 MFR PP (44 wt % Septon 2004, 56 wt % polypropylene) and was prepared on a 30 mm ZSK twin-screw extruder (150 rpm, 210° C.). 1000 to 1500 ppm each of Irganox™ 1010 phenolic stabilizer (Ciba Specialty Chemicals (BASF America), Florham Park, N.J.) and Ultranox™ 626 organophosphite stabilizer (Chemtura Corp., Middlebury, Conn.), along with nucleating agent (fine-sized sodium benzoate or Millad 3988 from Milliken; 2000-3000 ppm) were incorporated during preparation of the elastomer masterbatch.

The above masterbatches, along with additional amounts, if needed, of the neat 65 MFR polypropylene (stabilized and nucleated) and Septon 2004 were melt-compounded on a 3 lb (1350 g) Banbury mixer, to obtain different compositions varying in elastomer and filler content. A stabilizer package of 1000-1500 ppm each of Irganox™ 1010 phenolic stabilizer (Ciba Specialty Chemicals (BASF America), Florham Park, N.J.) and Ultranox™ 626 organophosphite stabilizer (Chemtura Corp., Middlebury, Conn.) was used during compounding. The Banbury drops were ground and fed to the 30 mm ZSK twin-screw extruder to obtain pelletized products for testing.

B. One-step Mixing of Neat Ingredients.

In this compounding mode, neat ingredients were added to a twin-screw mixing extruder to produce a directly-finished end-product. In this approach, neat polypropylene was introduced at the main feed of a 27 mm Leistritz twin-screw extruder (American Leistritz Extruders Lab, Somerville, N.J.). The screw design typically involved an L/D of about 48-52. Neat MOS fibers were introduced about 12 D further down the screw from the main feed, via a side-stuffer. The hydrogenated elastomer was fed through a second side-stuffer, about 15 D down from the first side-stuffer. Mixing elements at the feed end were chosen to quickly melt the polypropylene, so that the fibers were fed into molten polymer. Following fiber incorporation, relatively mild mixing conditions were set, to avoid fiber breakage but still disperse the fibers and elastomer within the polypropylene matrix. It was desired that the fibers remain in the polypropylene phase, rather than the elastomer, to afford maximum reinforcement.

The MOS was treated, prior to being fed to the extruder: i) pre-dried, since MOS fibers are hygroscopic, ii) contacted with magnesium oxide (neutralize alkaline MOS), and iii) contacted with magnesium stearate (dispersant for fibers). The molten compound strands were extruded onto a conveyor belt, rather than into a water bath, for moisture control. The strands were chopped into pellets for property testing.

C. Small-scale Mixing on Micro-compounder.

For preliminary scoping studies (<100 g), a Thermo-Haake MiniLab micro-compounder with robotic feeding, pelletization and collection capability was used (Thermo Scientific, Waltham, Mass.). Mixing was accomplished via counter-rotating, conical twin screws. Typical run conditions were 200° C. melt temperature, 125 rpm screw speed and 3 min mixing time.

The preparation of prototype compounds for broad-based property testing was usually performed using the first two mixing approaches, where sufficient product quantities were accessible. Micro-compounder experiments were generally restricted to scoping studies, for example, comparing the influence of alternate neat ingredients on a particular property (e.g., the influence of MOS versus talc on modulus reinforcement).

Testing

The two testing standards available for the measurement of stiffness and impact performance are ASTM and ISO. Both standards are used, though ISO appears predominant, world-wide, for certifying automotive materials. Corresponding test designations for the target physical properties are shown in Table 6.

TABLE 6

Measurement Standard of Key Composition Properties

| Property | ASTM | ISO |
|---|---|---|
| Flexural Modulus (1% Secant) | D-790 | 178 |
| Notched Izod Impact (J/temperature) | D-256 | 180 |
| Heat Distortion Temperature (HDT) | D-648 | 75-2 |
| Coefficient of Linear Thermal Expansion (CLTE) | E-831 | 11359-1.2 |
| Ductile-Brittle Transition Temperature (Instrumented Impact) | D-3763 | 6603-2 |
| Melt Flow Rate (MFR) (230° C., 2.16 kg) | D-1238 | 1133 |

Figure 4:
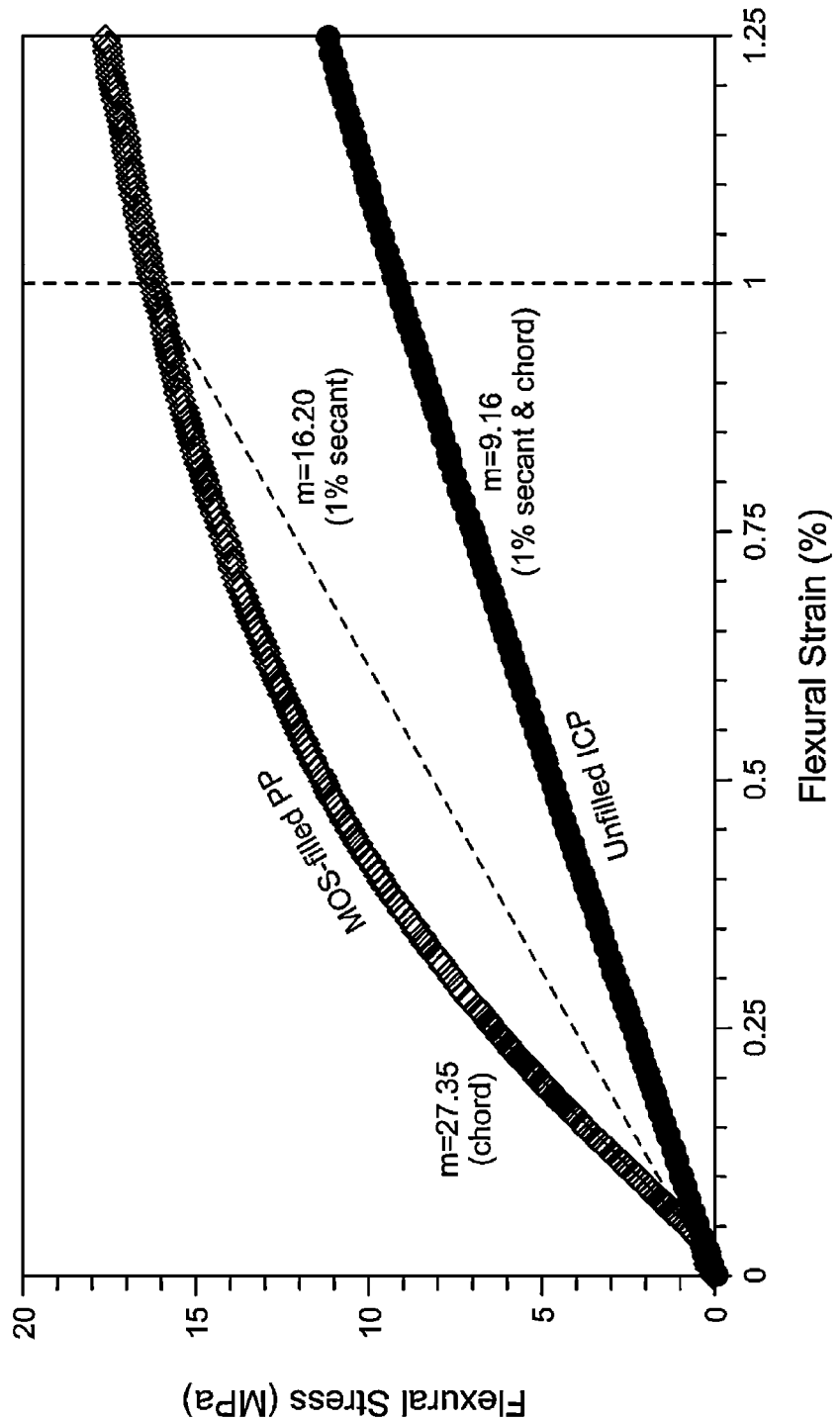
FIG. 4 is a plot of the Chord (between 0.05 and 0.25% strain) Modulus and 1% secant modulus for i) Unfilled ICP polypropylene (PP-8224 E2, ExxonMobil) and ii) filled composition (30 wt % MOS in 4.6 MFR polypropylene).

There are differences between ASTM and ISO testing, particularly for the two main properties of Flexural modulus and impact strength. On modulus, there are differences in specimen dimensions and the speed of testing. More important, the ISO Flexural modulus is exclusively a Chord Modulus (slope 'm' of Chord drawn between 0.05% and 0.25% strain as specified by ISO), while ASTM permits determination of tangent, secant, or Chord moduli. The ASTM 1% secant Flexural modulus value (slope 'm' of line drawn from origin to point on curve at 1% strain) is a widely reported number (e.g., on product data sheets from suppliers) used to characterize the stiffness of polypropylene-based compositions. The differences between these two for a neat ICP and a filled polypropylene are shown in FIG. 4. For neat polypropylenes (unfilled homopolymers and copolymers, including impact copolymers), there is very little difference between the two. By contrast, the MOS-filled polypropylene composition shows a much higher Chord Modulus value.

Figure 5A:
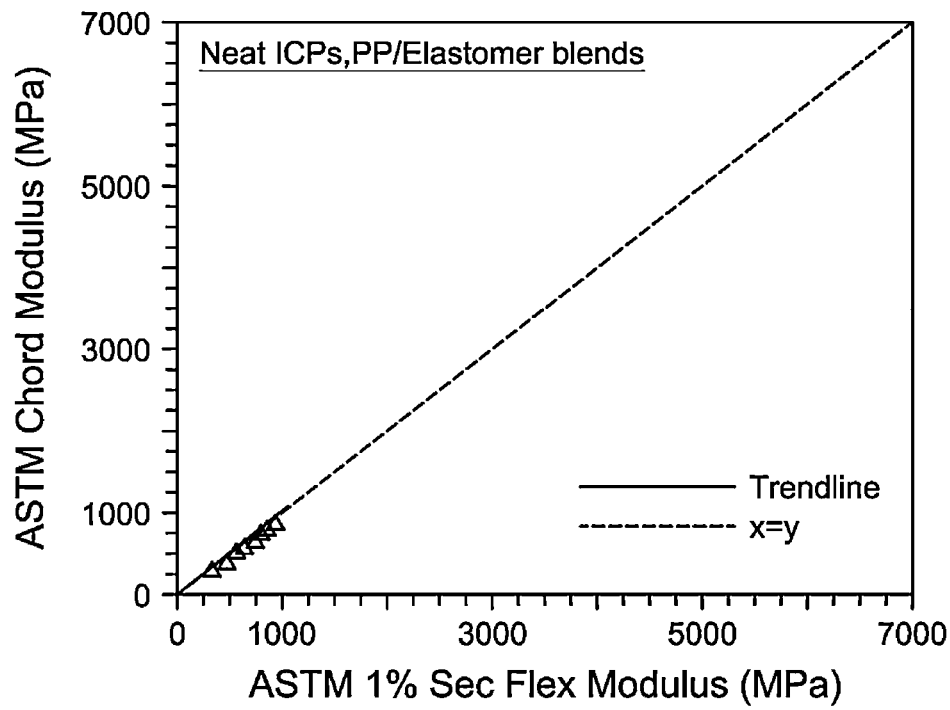
FIGS. 5A-C are plots of the ASTM Chord Modulus versus the ASTM 1% Sec Flex Modulus (A-neat ICP; B-talc filled compositions; C-MOS-filled PP bi-blends).
Figure 5B:
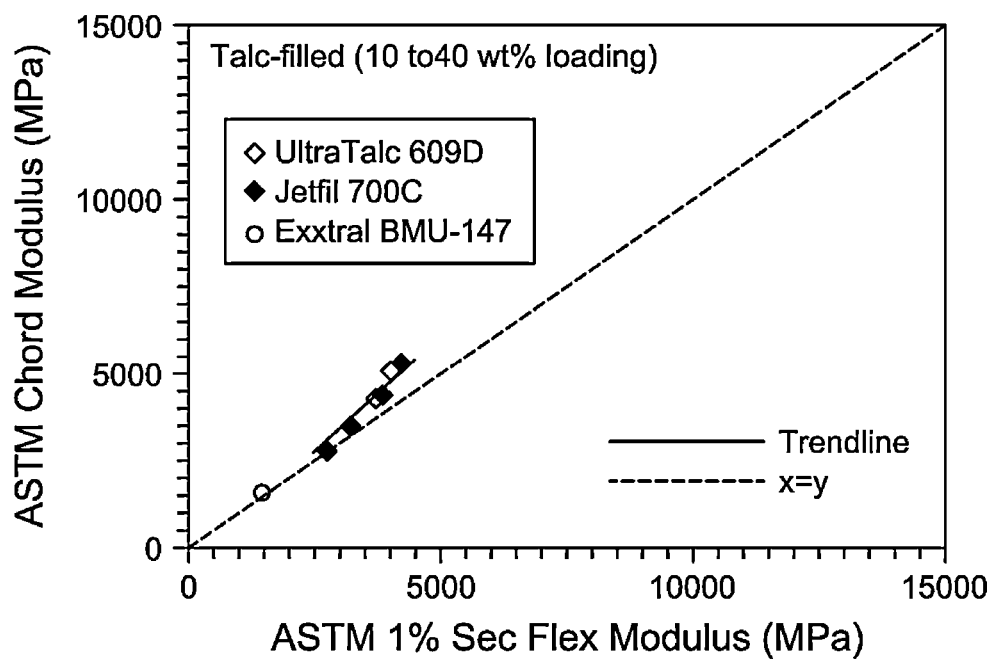
Figure 5C:
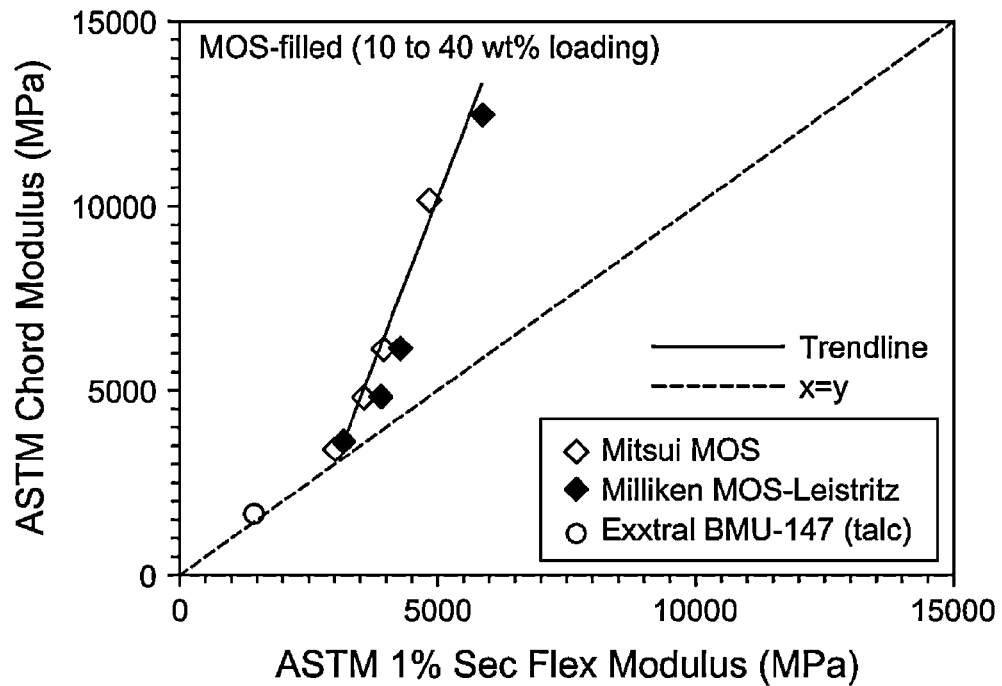

The relationships between Chord and 1% secant Flexural moduli for a variety of neat polypropylenes, talc-filled polypropylenes (loading levels 10 to 40 wt %); and MOS-filled polypropylenes (loading levels 10 to 40 wt %) are shown in FIG. 5. FIGS. 5A, 5B and 5C, illustrate the differences among unfilled, talc-filled and MOS-filled compositions. In particular, FIG. 5C plots MOS-filled polypropylene compositions (1 to 40 wt % MOS). Data points of MOS incorporation via the MOS masterbatch (Mitsui) and via compounding of neat MOS fibers (Milliken) are both included. The responses of the two appear very similar, leading to a single trend line. Of note is the substantial slope of the relationship for this high aspect ratio filler, with Chord Modulus values significantly higher than those of 1% secant and far removed from the x=y line. The difference ("Δ") between the two moduli numbers increases with increasing stiffness. This relationship was unexpected and quite different from that displayed by neat and talc-filled polypropylenes. Thus, there are significant differences in the values of Flexural Modulus reported via ASTM and ISO standards.

Regarding impact strength, specifically Notched Izod at low temperatures, there are again differences between the ASTM and ISO standards. The testing protocols differ in the specification of specimen dimensions, pendulum size and data reporting. Data measurements indicate that the ISO standard is far more rigorous than ASTM, resulting in lower values. The results show that ASTM testing provides more favorable Notched Izod, but lower Flexural modulus values.

Measurements on experimental compounds are reported here via both ASTM and ISO standards, however ISO-based data formed the basis for assessing the performance of the compositions. The instrumented impact measurement of ductile—brittle temperature was conducted via ASTM (D 3763).

Compound Preparation

A. Via Masterbatch (i.e. No Neat MOS Fiber Addition)

The following products were used to prepare Examples 1 through 7:

Two pre-prepared masterbatches (30 mm ZSK twin-screw extruder) of Septon 2004, hydrogenated SIS block copolymer in polypropylene
MB 1: 44 wt % Septon 2004, 56 wt % 65 MFR PP-9999SS from ExxonMobil Chemical
MB 2: 44 wt % Septon 2004, 56 wt % 4.6 MFR PP from ExxonMobil Chemical
Mitsui's MOS masterbatch (70 wt % Mos Hige A, 30 wt % Mitsui ICP J-747)
Internal MOS masterbatch prepared on Leistritz (50% Milliken's HPR-803, 50% 4.6 MFR PP)
Neat PP-9999SS
Neat Septon 2004

These seven composition Examples are described in Table 7. The hydrogenated styrene-isoprene-styrene block copolymer was the elastomer (Septon 2004). Two polypropylene homopolymers were used, the 65 MFR ExxonMobil polypropylene PP-9999SS, and the 4.6 MFR polypropylene (from ExxonMobil). MOS fibers were the filler (Mitsui MOS masterbatch). Property data on the compositions are described in Table 8, where "CLTE/flow" is the CLTE in the flow direction, while "x-flow" is the CLTE in the cross-flow direction. The MFR of the composition is in parenthesis in column 1 The "BMU-147" is ExxonMobil's Exxtral™ grade which is shown as a comparative, which is 18 wt % talc filled and 23 wt % total rubber content.

TABLE 7

Example Compositions Prepared from MOS and Septon 2004 Materbatches

| Ingredient | 1 | 2 | 3 | 4 | 5 | 6 | 7 |
|---|---|---|---|---|---|---|---|
| Hydrogenated SIS | 31 | 31 | 30 | 31.2 | 25.5 | 25.1 | 30.2 |
| MOS Fiber filler | 30 | 30 | 29.5 | 20.4 | 40.7 | 45.3 | 25 |
| 65 MFR PP | 26 | — | 11 | 39.7 | 16.3 | 10.2 | 19.8 |
| 4.6 MFR PP | — | 26 | 29.5 | — | — | — | 25 |
| ICP base (from MOS MB) | 13 | 13 | — | 8.7 | 17.5 | 19.4 | — |

In Table 8, I/23 through I/−29 are Notched Izod at 23° C., 0° C., −18° C., −29° C. by ISO 180; 10 specimens at each temperature; P=partial breaks, H=hinged breaks, C=complete breaks. HDT means HDT-B by ISO 75-2. Finally, CLTE is the Coefficient of Linear Thermal Expansion by ISO 11359.

A plot of the stiffness/low temperature toughness balance is shown in FIG. 1B, where the −29° C. Notched Izod impact numbers are plotted against Flexural modulus, following the ISO testing standard. FIG. 1B also shows data on current commercial automotive compounds, including well-regarded industry standards previously described in Table 1.

The plot in FIG. 1B shows the prototype Examples to exhibit a profile of higher stiffness and higher impact resistance than commercially available products, including current industry standards. All of the inventive Examples are located along a band to the right of the boundary line that sets the limit for high stiffness/high low-temperature impact for current commercial compounds. The data indicate that the target profile of 2500 to 3000 MPa Flexural modulus and 10 kJ/m$^2$ Notched Izod at −29° C. falls within the envelope of the inventive Examples. The inventive Examples define a family of higher-performing product compounds than current industry standards. Improved application-specific properties (e.g., highest stiffness or highest impact) can be designed from the base ingredients by changing the compositional makeup.

From the data in Table 7 and FIG. 1B, Example 1 is observed to display a favorable profile of high stiffness and high low-temperature Izod Impact, so multi-axial impact testing was conducted. Measurements were made on an Instron™ Dynatup 9250HV unit, per ASTM D-3763 (6 specimens per test condition). This test determines the energy needed for sample failure at low temperatures, and the failure mode. Compounds that display ductile failures at low temperatures with high energy requirements are favored products. The test results are shown in Table 9. Example 1 displays low temperature ductility similar to the perfor-

TABLE 8

ISO Properties of the Example Compositions made from Masterbatches

| Example (MFR) | Modulus (MPa) | I/23 (kJ/m$^2$) | I/0 (kJ/m$^2$) | I/−18 (kJ/m$^2$) | I/−29 (kJ/m$^2$) | HDT (° C.) | CLTE/flow (° C.$^{-1}$) | CLTE/x-flow (° C.$^{-1}$) |
|---|---|---|---|---|---|---|---|---|
| 1 (22.6) | 2799 | 67 10P | 58 10P | 40 10P | 10 4P 6C | 106 | 2E$^{-5}$ | 14.9E$^{-5}$ |
| 2 (7.9) | 2734 | 67 10P | 49 10P | 11 2P 8C | 8 1P 9C | 101 | 1.7E$^{-5}$ | 10.3E$^{-5}$ |
| 3 (8.1) | 2998 | 66 10P | 34 10P | 11 5P 5C | 6 1P 9C | 109 | 1.8E$^{-5}$ | 14.7E$^{-5}$ |
| 5 (20.2) | 3935 | 68 10P | 27 10P | 5 3P 3C | 5 1P 1H 8C | 111 | 1.3E$^{-5}$ | 14.1E$^{-5}$ |
| 6 (17.6) | 4041 | 69 10P | 30 10P | 6 7P 3C | 4 1P 9C | 112 | 1.2E$^{-5}$ | 14.1E$^{-5}$ |
| 7 (9.5) | 3026 | 62 10P | 26 10P | 10 4P 6C | 6 10C | 109 | 2E$^{-5}$ | 15E$^{-5}$ |
| BMU-147 (14) | 1856 | 53 10P | 21 10P | 8 10C | 5 10C | 99 | 4.4E$^{-5}$ | 12.6E$^{-5}$ | mance of the EMCC commercial product Exxtral™ H-1025 (control), which is well-regarded for its cold temperature impact resistance.

TABLE 9

Low-temperature Ductility on Example 1 and Exxtral H-1025

| Property | Example 1 | Exxtral H-1025 |
|---|---|---|
| Appearance | Adequate | Adequate |
| Ductility (−29° C., 15 mph, 10 lb) | 5/6 ductile, 1/6 ductile-brittle | 6/6 ductile |
| Ductility (−29° C., 5 mph, 10 lb) | 6/6 ductile | 6/6 ductile |
| Ductility (0° C., 5 mph, 10 lb) | 6/6 ductile | 6/6 ductile |

Finally, as a check on the data measurement step, key measured properties of the control compound, Exxtral™ BMU-147, were compared against typical values reported in the ExxonMobil datasheet. Those results are in Table 10.

TABLE 10

Measured ISO values and Data sheet ISO values

| Property | Measured ISO Value | Published Datasheet ISO |
|---|---|---|
| Flexural Modulus at 23° C. (MPa) | 1856 | 1760 |
| Notched Izod Impact at 23° C. (kJ/m$^2$) | 52 | 39 |
| Heat Distortion Temp. at 1.8 MPa (° C.) | 55 | 53 |

B. Via One-step Mixing of Neat Ingredients (i.e. Mixing Neat PP, Elastomer, MOS Fibers)

The mixing was conducted on a 27 mm, Leistritz twin-screw extruder, as previously described. The screw and feed designs were set-up to obtain adequate mixing of the ingredients, while preserving the aspect ratio of the MOS fibers. This involved using a side-stuffer downstream to feed the MOS fibers, after they were thoroughly dried and treated with magnesium oxide and magnesium stearate. Optionally, the MOS fibers were lightly treated with Luperox 101 (Arkema), an organic peroxide (2,5-Bis(tert-butylperoxy)-2,5-dimethylhexane), to promote some grafting to polypropylene and also to lower the hydrophilicity of the MOS fibers. The screw elements were chosen to achieve fast melting of the polypropylene fed at the main hopper to ensure fiber feed into molten polymer, and to minimize working the melt downstream of fiber addition, to reduce fiber breakage. The screw had an L/D of 52.

Four compound Examples were prepared as shown in Table 11. Property data (ASTM) on Examples 8 through 11 are shown in Table 11, wherein "I" is Izod Impact (kJ/m$^2$). Also, in Table 11 "P" means "partial break", "H" means "hinged break" and "C" means "complete break"; and the HDT is at 0.45 MPa by ASTM D-648(C). Examples 8, 9, 10 and 11 were run sequentially on the Leistritz twin-screw extruder. The data indicate a drop-off of peroxide influence, after the compounding of Example 8. The MFR of Example 8 shows the expected increase in compound MFR due to the presence of peroxide (30 MFR for the filled final compound versus about 5 MFR for both the PP and elastomer starting ingredients). Examples 9 and 10 display MFRs lower than Example 8, but comparable to each other, despite the doubling of peroxide (0.5 wt % to 1 wt % respectively). Example 11 has an even lower MFR (2.2). A markedly higher modulus value is observed for Example 8. The modulus and heat distortion temperatures (HDT) of the Examples are internally consistent (i.e high modulus is accompanied by high HDT).

TABLE 11

Example Compounds Prepared on Leistritz twin-screw extruder via one-step Mixing from Neat Ingredients

| Ingredient (wt %) | 8 | 9 | 10 | 11 |
|---|---|---|---|---|
| Septon 2004 | 20 | 30 | 30 | 30 |
| Neat MOS fibers (HPR-803) | 40 | 40 | 40 | 50 |
| .6 MFR PP (w/nucleating agent) | 40 | 30 | 30 | 20 |
| Peroxide | 0.5 | 0.5 | 1.0 | 0.5 |

TABLE 12

Property Data on Compound Examples Prepared via One-Step Mixing

| Example | MFR (g/10 min) | Modulus (ASTM 1% sec, MPa) | I/23 (ASTM, kJ/m$^2$) | I/0 (ASTM, kJ/m$^2$) | I/−18 (ASTM, kJ/m$^2$) | I/−29 (ASTM, kJ/m$^2$) | HDT (° C.) (ASTM HDT-B) |
|---|---|---|---|---|---|---|---|
| 8 | 30.3 | 3790 | 3.2, C | 2.3, C | 1.9, C | 1.5, C | 143 |
| 9 | 14.3 | 2136 | 12.7, P | 5.9, C | 4.3, C | 3.7, C | 130 |
| 10 | 14.4 | 2198 | 12.2, P | 5.6, C | 4.4, C | 3.8, C | 131 |
| 11 | 2.2 | 1651 | 15.6, P | 9.4, P | 6.3, H | 4.9, H | 121 |

A surprising observation was the poor impact performance of Examples 8 through 11, even at ambient temperature. The Notched Izod impact values are substantially lower than Examples 1 through 7, prepared via masterbatch (see Table 8 and FIG. 1B). The influence of peroxide in lowering the molecular weight of the matrix PP in Example 8, leading to a reduction of impact strength is well known and was anticipated. However all the other Examples show similarly low impact numbers, despite (1) having more elastomer (30 versus 20 wt % in Example 8), and (2) being of higher molecular weight and not influenced by the presence of peroxide.

Figure 7:
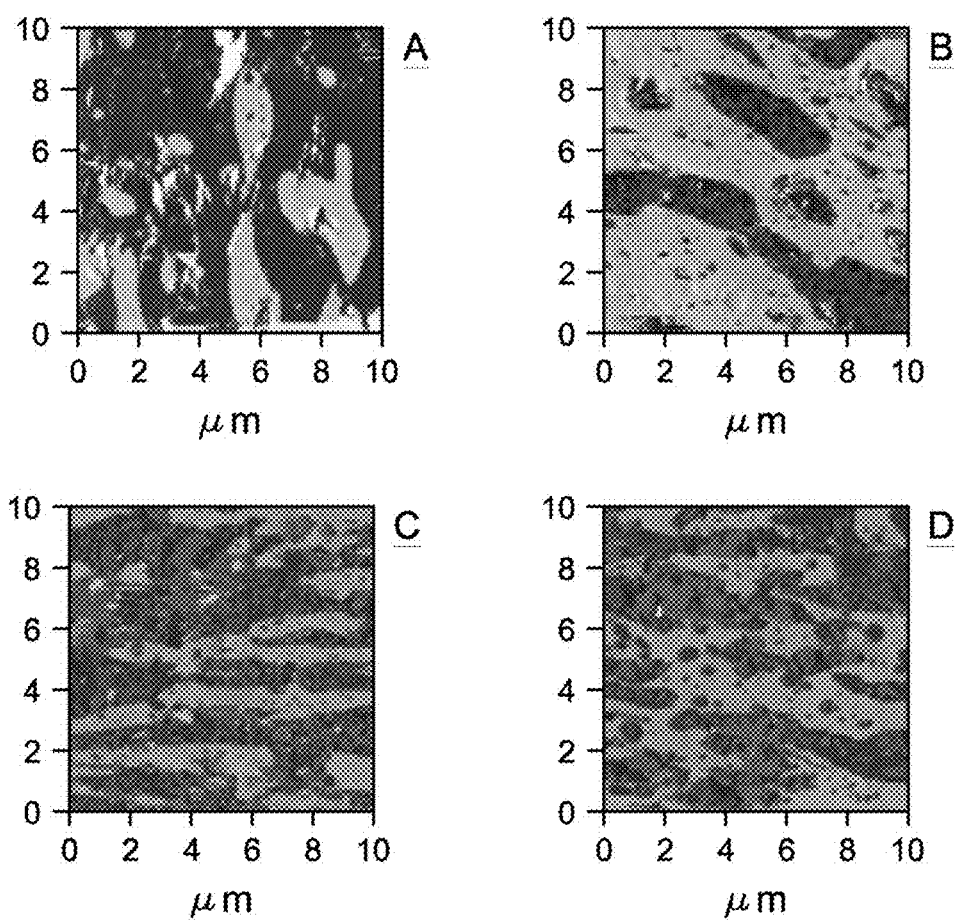
FIG. 7 contains Atomic Force Microscopy (AFM) phase images of Morphologies of Examples 8, 9, 10 and 11; where AFM is from Asylum Research, CA; Light: Soft phase, Dark: Hard phase; and where 7 refers to Examples 8-11, respectively.

AFM phase images (AFM from Asylum Research, CA) of the morphologies of Examples 8 through 11, shown in FIG. 7, reveal lighter images that reflect soft phases (elastomer) while darker images indicate hard phases (PP). The image of Example 8 indicates a PP continuous phase, with a dispersed phase of the hydrogenated SIS elastomer. MOS filler moieties are observed to reside primarily within the PP matrix, examples of which are identified by arrows. Compared to Example 8, Examples 9 and 10 contain a higher level of the elastomer (from 20 to 30 wt %), while Example 11 has the highest loading of MOS filler (50 wt %), also at 30 wt % elastomer. Surprisingly, at the higher elastomer level (approx. 30 wt %), the phase morphology inverts, with the elastomer now assuming the continuous phase position. The MOS filler appears to remain primarily in the PP phase (dispersed phase), frequently adjacent to the elastomer. This inversion occurs at about 30 wt % elastomer, but not at 20% (Example 8 versus 9). This morphology is undesirable for favorable physical properties, as reflected by the data above. Additional results have shown the inversion to occur when the elastomer content exceeds 26 wt % using this method of making the composition. These data suggest that to obtain good properties via a one-step mixing approach, that (1) the elastomer loading be no more than 26 wt % to maintain an elastomer-dispersed phase morphology for impact toughening; and (2) do not add or otherwise expose the ingredients to peroxide to maintain the polypropylene matrix at a sufficiently high molecular weight to provide adequate matrix toughness.

Based on the constraints discussed above, Example 12 was compounded on the same Leistritz twin-screw extruder. Neat MOS fibers (30 wt %) were again used, but with no peroxide treatment. The elastomer (Septon 2004) level was 26 wt %, to maintain PP as the continuous phase, using 10 wt % of 4.6 MFR polypropylene and 34 wt % of 65 MFR polypropylene. The extrusion process conditions were similar to those used for Examples 8 through 11. It was of interest to see if under these restrictions, the stiffness/impact balance of the one-step compounded Example 12 matched the performance of compounds obtained via the masterbatch approach. ISO-based property data on the compound, Example 12, are presented in Table 13.

TABLE 13

ISO-based Property Data on Inventive Example 12 Prepared via one-step Mixing.

| Example (MFR) | Modulus (Chord) (MPa) | I/23 (kJ/m$^2$) | I/0 (kJ/m$^2$) | I/−18 (kJ/m$^2$) | I/−29 (kJ/m$^2$) | HDT (° C.) | CLTE/ Flow (° C.$^{-1}$) | CLTE/x-flow (° C.$^{-1}$) |
|---|---|---|---|---|---|---|---|---|
| 12 (12.6) | 4280 | 26, 10P 10P | 7.4 | 4.6 5P 5C | 4.1 10C | 126 | 2.0E$^{-5}$ | 14.6E$^{-5}$ |

Figure 6:
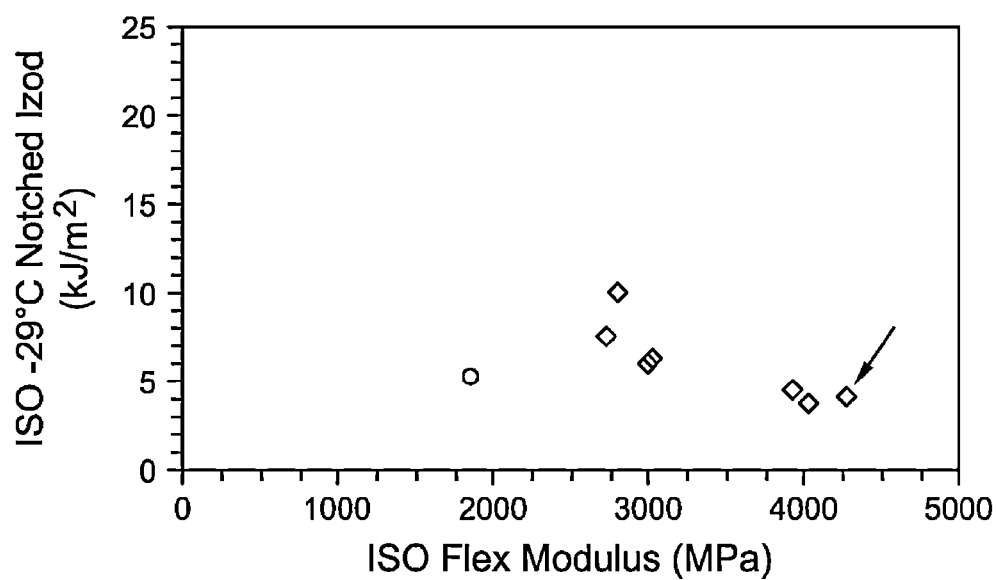
FIG. 6 is a plot of the ISO-based Stiffness/Impact Balance of One-Step Compounded Example 12 (arrow) plotted alongside Masterbatch-based Examples 1, 2, 3, 5, 6, 7 (with increasing modulus: BMU-147 control, and Examples 2, 1, 3, 7, 5, 6, 12).

The stiffness/toughness profile of Example 12, prepared via one-step mixing, is observed to fit the properties trend (also ISO-based) of compounds prepared via the masterbatch route, which have similar levels of elastomer and MOS. This is shown in FIG. 6, where Example 12 is positioned alongside Examples 5 and 6. All three of these compounds contain about 25 wt % of the elastomer. Their impact strengths are comparable, while small differences are observed in Flexural Modulus (slightly lower values for Examples 5 and 6 versus Example 12). This lowering in Examples 5 and 6, via the MB approach, is likely due to competing composition-based influences: a higher MOS level providing increased reinforcement versus an ICP matrix providing lower inherent stiffness.

The above results suggest that the one-step compound preparation mode: (1) will provide compounds with comparable stiffness/impact balance to those made via the masterbatch approach, under conditions where the elastomer is present as dispersed phase within the PP matrix; and (2) is restricted in the amount of elastomer that can be incorporated to systems where polypropylene phase continuity exists. High-impact compositions, involving significant levels of elastomer, may be outside the capability of this compound preparation mode.

Now, having described the various features of the invention(s), described here in numbered paragraphs is:

P1. A composition comprising (or consisting essentially of, or consisting of) a continuous phase of polypropylene; within the range of from 5 wt % to 50 wt % of a filler by weight of the composition, having an aspect ratio within the range of from 5 or 6 or 8 to 20 or 40 or 100 or 200 or 800 or 1000; and within the range of from 5 wt % to 40 wt % of a olefin block-containing copolymer by weight of the composition, preferably forming a discreet phase within the continuous phase.

P2. The composition of paragraph 1, wherein the filler is a mineral hydroxide filler; preferably, wherein the filler is a metal salt of an oxysulfate, aluminoxysulfate, aluminosilicate, silicate, borate, or combination thereof; most preferably, wherein the filler is a magnesium or calcium oxysulfate (e.g., MgSO$_4$. 5Mg(OH)$_2$.3H$_2$O).

P3. The composition of paragraph 1 or 2, wherein the olefin block-containing copolymer is selected from the group consisting of styrene-butadiene-styrene block copolymers, styrene-isoprene-styrene block copolymers, styrene-ethylene/propylene-styrene block polymers, styrene-ethylene/butene-styrene block polymers, and hydrogenated versions thereof and blends thereof.

P4. The composition of any one of the previous numbered paragraphs, wherein the olefin block-containing copolymer is a styrene-olefin block copolymer having within the range of from 5 wt % to 25 wt % styrene-derived units by weight of the copolymer, which may or may not be hydrogenated.

P5. The composition of any one of the previous numbered paragraphs, wherein the polypropylene has a melt flow rate ("MFR", 230° C./2.16 kg) within the range of from 4 or 12 g/10 min to 70 or 80 g/10 min.

P6. The composition of any one of the previous numbered paragraphs, wherein the polypropylene has a melting point temperature ("T$_m$", DSC) within the range of from 130 or 140 or 150° C. to 160 or 165 or 170° C.

P7. The composition of any one of the previous numbered paragraphs, having a 1% Secant Flexural Modulus (ISO) of greater than 2000 or 2500 or 3000 MPa; or within the range of from 2000 or 3000 MPa to 5000 MPa.

P8. The composition of any one of the previous numbered paragraphs, having a Notched Izod Impact Resistance (−29° C., ISO) of greater than 2 or 5 or 8 or 10 kJ/m$^2$; or within a range of from 2 or 5 or 10 kJ/m$^2$ to 15 or 20 kJ/m$^2$.

P9. The composition of any one of the previous numbered paragraphs, wherein the Chord Modulus changes by at least 2 or 2.5 or 3 or 3.5 times (or changes by a coefficient within the range of from 2 or 2.5 to 3.5 or 4 or 4.5) the change in 1% Secant Flexural Modulus over a range of 10 to 40 wt % loading of the filler; alternatively, wherein the slope (m) of the Chord Modulus (y) versus 1% secant Flexural Modulus (x) line is greater than 1.8, more preferably greater than 2.0 or 2.5, most preferably greater than 3.0 or 3.4.

P10. The composition of any one of the previous numbered paragraphs, having a heat distortion temperature ("HDT") within the range of from 90 or 95° C. to 100 or 110 or 130° C.

P11. The composition of any one of the previous numbered paragraphs, having a flow direction Coefficient of Linear Thermal Expansion ("CLTE") within the range of from $0.50 \times 10^{-5}/°$ C. to $3.0 \times 10^{-5}/°$ C.; and a cross-flow direction CLTE within the range of from $8.0 \times 10^{5}/°$ C. to $15.0 \times 10^{5}/°$ C.

P12. The composition of any one of the previous numbered paragraphs, wherein the MFR of the composition is within the range of from 5 g/10 min to 30 or 50 g/10 min.

P13. The composition of any one of the previous numbered paragraphs, wherein polar-graft polymers are absent; and preferably where peroxides are absent.

P14. The composition of any one of the previous numbered paragraphs, wherein on a line defined by the ISO-based −29° C. Notched Izod as a function of the ISO-based Flexural Modulus, y=−0.0038x+15.27, the compositions fall above and to the right of the line; wherein the compositions fall above lines of similar slope and having y-intercepts of 16 or 16.5 or 17.

P15. An automotive component comprising (or consisting essentially of) the composition of any one of the previous numbered paragraphs.

P16. A method of forming the composition of any one of the previous numbered paragraphs, the method comprising (or consisting essentially of) combining and melt processing: a first mixture of a propylene-based polymer and a filler having an aspect ratio within the range of from 5 to 1000; with a second mixture of a propylene-based polymer and olefin block-containing copolymer; and isolating the composition; wherein the composition comprises a continuous phase of polypropylene and within the range of from 5 wt % to 50 wt % of the filler and within the range of from 5 wt % to 40 wt % of a olefin block-containing copolymer.

P17. A method of forming the composition of any one of the previous numbered paragraphs 1-14, the method comprising (or consisting essentially of) combining and melt processing: a neat filler having an aspect ratio within the range of from 5 to 1000; with a polypropylene and olefin block-containing copolymer, together or separately; and isolating the composition; wherein the composition comprises a continuous phase of polypropylene and within the range of from 5 wt % to 50 wt % of the filler and within the range of from 5 wt % to 26 wt % of a olefin block-containing copolymer.

P18. The method of paragraph 15 or 17, wherein the components are added in the order of: polypropylene, neat filler, and olefin block-containing copolymer, wherein the neat filler is dispersed within the melted polypropylene, and the olefin block-containing copolymer is added and dispersed within the polypropylene-filler mix.

Also disclosed herein is the use of the filler in a composition comprising (or consisting essentially of) polypropylene and within the range of from 5 wt % to 40 wt % of a olefin block-containing copolymer by weight of the composition.

Also disclosed herein is the use of a composition in any one of the previous numbered paragraphs 1 to 13 in an article of manufacture as described herein.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A composition comprising a continuous phase of polypropylene; and
within the range of from 30 wt % to 50 wt % of a mineral hydroxide filler by weight of the composition, the mineral hydroxide filler having an aspect ratio within the range of from 5 to 1000; and
within the range of from 5 wt % to 40 wt % of a olefin block-containing copolymer by weight of the composition;
wherein the polypropylene is present within a range from 10 wt % to 29.5 wt % by weight of the composition,
wherein the composition has a 1% Secant Flexural Modulus (ISO) of greater than 2000 MPa and a Notched Izod Impact Resistance (−29° C., ISO) of greater than 5 kJ/m$^2$,
wherein polar-graft polymers are absent and the filler excludes silicate fillers.

2. The composition of claim 1, wherein the mineral hydroxide filler is a metal salt of an oxysulfate, aluminoxysulfate, borate, or combination thereof.

3. The composition of claim 1, wherein the olefin block-containing copolymer is selected from the group consisting of styrene-butadiene-styrene block copolymers, styrene-isoprene-styrene block copolymers, styrene-ethylene/propylene-styrene block polymers, styrene-ethylene/butene/styrene block polymers, and hydrogenated versions thereof and blends thereof.

4. The composition of claim 1, wherein the olefin block-containing copolymer is a styrene-olefin block copolymer having within the range of from 5 wt % to 25 wt % styrene-derived units by weight of the copolymer, which may or may not be hydrogenated.

5. The composition of claim 1, wherein the polypropylene has a MFR within the range of from 4 g/10 min to 100 g/10 min.

6. The composition of claim 1, wherein the polypropylene has a melting point temperature ("$T_m$", DSC) within the range of from 130° C. to 170° C.

7. The composition of claim 1, having a 1% Secant Flexural Modulus (ISO) of 3000 to 5000 MPa.

8. The composition of claim 1, having a Notched Izod Impact Resistance (−29° C., ISO) of 6 to 20 kJ/m$^2$.

9. The composition of claim 1, wherein the slope (m) of the Chord Modulus (y) as a function of 1% Secant Flexural Modulus (x) line is greater than 1.8.

10. The composition of claim 1, having a heat distortion temperature ("HDT") within the range of from 90° C. to 130° C.

11. The composition of claim 1, having a flow direction Coefficient of Linear Thermal Expansion ("CLTE") within the range of from $0.50 \times 10^{-5}/°$ C. to $3.0 \times 10^{-5}/°$ C.; and
a cross-flow direction CLTE within the range of from $8.0 \times 10^{-5}/°$ C. to $15.0 \times 10^{-5}/°$ C.

12. The composition of claim 1, wherein the MFR of the composition is within the range of from 5 g/10 min to 100 g/10 min.

13. An automotive component comprising the composition of claim 1.

14. The composition of claim 1, wherein the polypropylene has a MFR within the range of from 4 g/10 min to 100 g/10 min.

15. The composition of claim 1, wherein the mineral hydroxide filler is magnesium oxysulfate.

16. The composition of claim 1, wherein:
   a) the olefin block-containing copolymer is selected from the group consisting of styrene-butadiene-styrene block copolymers, styrene-isoprene-styrene block copolymers, styrene-ethylene/propylene-styrene block polymers, styrene-ethylene/butene/styrene block polymers, and hydrogenated versions thereof and blends thereof;
   b) the olefin block-containing copolymer is a styrene-olefin block copolymer having within the range of from 5 wt % to 25 wt % styrene-derived units by weight of the copolymer, which may or may not be hydrogenated;
   c) the polypropylene has a MFR within the range of from 4 g/10 min to 100 g/10 min and a melting point temperature ("$T_m$", DSC) within the range of from 130° C. to 170° C.;
   d) the composition has a 1% Secant Flexural Modulus (ISO) of 3000 to 5000 MPa;
   e) the composition has a Notched Izod Impact Resistance (−29° C., ISO) of 6 to 20 kJ/m$^2$;
   f) the slope (m) of the Chord Modulus (y) as a function of 1% Secant Flexural Modulus (x) line is greater than 1.8;
   g) the composition has a heat distortion temperature ("HDT") within the range of from 90° C. to 130° C.;
   h) the composition has a flow direction Coefficient of Linear Thermal Expansion ("CLTE") within the range of from $0.50 \times 10^{-5}$/° C. to $3.0 \times 10^{-5}$/° C.; and a cross-flow direction CLTE within the range of from $8.0 \times 10^{-5}$/° C. to $15.0 \times 10^{-5}$/° C.;
   i) the composition has a an MFR of from 5 g/10 min to 100 g/10 min, and j) wherein polar-graft polymers are absent.

17. The composition of claim 1, wherein the mineral hydroxide filler is a magnesium salt of an oxysulfate, aluminoxysulfate, borate, or combination thereof.

18. The composition of claim 1, obtained by the method comprising combining and melt processing:
   a first mixture of a propylene-based polymer and a mineral hydroxide filler having an aspect ratio within the range of from 5 to 1000; with
   a second mixture of a propylene-based polymer and olefin block-containing copolymer; and
   isolating the composition;
   wherein the composition comprises a continuous phase of polypropylene and within the range of from 30 wt % to 50 wt % of the filler and within the range of from 5 wt % to 40 wt % of a olefin block-containing copolymer.

19. The composition of claim 18, wherein the olefin block-containing copolymer is selected from the group consisting of styrene-butadiene-styrene block copolymers, styrene-isoprene-styrene block copolymers, styrene-ethylene/propylene/styrene block polymers, styrene-ethylene/butadiene/ styrene block polymers, and hydrogenated versions thereof and blends thereof.

20. The composition of claim 18, wherein the olefin block-containing copolymer is a styrene-olefin block copolymer having within the range of from 5 wt % to 25 wt % styrene-derived units by weight of the copolymer, which may or may not be hydrogenated.

21. The composition of claim 18, wherein the polypropylene has a MFR within the range of from 4 g/10 min to 100 g/10 min.

22. The composition of claim 18, wherein the polypropylene has a melting point temperature ("$T_m$", DSC) within the range of from 130° C. to 170° C.

23. The composition of claim 18, wherein the composition has a 1% Secant Flexural Modulus (ISO) of greater than 2500 MPa.

24. The composition of claim 18, wherein the composition has a Notched Izod Impact Resistance (−29° C., ISO) of greater than 6 kJ/m$^2$.

25. The composition of claim 18, wherein the slope (m) of the Chord Modulus (y) as a function of 1% Secant Flexural Modulus (x) line is greater than 1.8.

26. The composition method of claim 18, wherein the MFR of the composition is within the range of from 5 g/10 min to 50 g/10 min.

27. The composition of claim 1, obtained by the method comprising combining and melt processing:
   a neat mineral hydroxide filler having an aspect ratio within the range of from 5 to 1000; with
   a polypropylene and olefin block-containing copolymer, together or separately; and
   isolating the composition;
   wherein the composition comprises a continuous phase of polypropylene and within the range of from 30 wt % to 50 wt % of the filler and within the range of from 5 wt % to 26 wt % of a olefin block-containing copolymer.

28. The composition of claim 27, wherein the polypropylene, neat mineral hydroxide filler, and olefin block-containing copolymer are added in the order of: polypropylene, neat mineral hydroxide filler, and olefin block-containing copolymer, wherein the neat mineral hydroxide filler is dispersed within the melted polypropylene, and the olefin block-containing copolymer is added and dispersed within the polypropylene-filler mix.

29. A composition comprising a continuous phase of polypropylene,
   within a range from 10 wt % to 29.5 wt % of polypropylene by weight of the composition, wherein the polypropylene has a melting point temperature ("Tm", DSC) within the range of from 130° C. to 170° C.; and
   within the range of from 30 wt % to 50 wt % of a mineral hydroxide filler by weight of the composition, the mineral hydroxide filler having an aspect ratio within the range of from 5 to 1000; and
   within the range of from 5 wt % to 40 wt % of a olefin block-containing copolymer by weight of the composition,
   wherein the olefin block-containing copolymer is selected from the group consisting of styrene-butadiene-styrene block copolymers, styrene-isoprene-styrene block copolymers, styrene-ethylene/propylene-styrene block polymers, styrene-ethylene/butene/styrene block polymers, and hydrogenated versions thereof and blends thereof,
      wherein the composition has a 1% Secant Flexural Modulus (ISO) of greater than 2000 MPa and a Notched Izod Impact Resistance (−29° C., ISO) of greater than 5 kJ/m$^2$,
      wherein polar-graft polymers are absent and the filler excludes silicate fillers.

30. The composition of claim 29, wherein the mineral hydroxide filler is a metal salt of an oxysulfate, aluminoxysulfate, borate, or combination thereof.

31. The composition of claim 29, wherein the olefin block-containing copolymer is a styrene-olefin block copolymer having within the range of from 5 wt % to 25 wt % styrene-derived units by weight of the copolymer, which may or may not be hydrogenated.

32. The composition of claim 29, having a 1% Secant Flexural Modulus (ISO) of 3000 to 5000 MPa.

33. The composition of claim 29, having a Notched Izod Impact Resistance (−29° C., ISO) of 6 to 20 kJ/m$^2$.

34. The composition of claim 29, wherein the slope (m) of the Chord Modulus (y) as a function of 1% Secant Flexural Modulus (x) line is greater than 1.8.

35. The composition of claim 29, having a heat distortion temperature ("HDT") within the range of from 90° C. to 130° C.

36. The composition of claim 29, having a flow direction Coefficient of Linear Thermal Expansion ("CLTE") within the range of from $0.50\times10^{-5}$/° C. to $3.0\times10^{-5}$/° C.; and a cross-flow direction CLTE within the range of from $8.0\times10^{-5}$/° C. to $15.0\times10^{-5}$/° C.

37. The composition of claim 29, wherein the MFR of the composition is within the range of from 5 g/10 min to 100 g/10 min.

38. An automotive component comprising the composition of claim 29.

39. The composition of claim 29, wherein the mineral hydroxide filler is magnesium oxysulfate.

40. The composition of claim 29, wherein the mineral hydroxide filler is a magnesium salt of an oxysulfate, aluminoxysulfate, borate, or combination thereof.

\* \* \* \* \*